US012283281B2

(12) United States Patent
Tyagi et al.

(10) Patent No.: US 12,283,281 B2
(45) Date of Patent: Apr. 22, 2025

(54) BITRATE DISTRIBUTION IN IMMERSIVE VOICE AND AUDIO SERVICES

(71) Applicant: Dolby Laboratories Licensing Corporation, San Francisco, CA (US)

(72) Inventors: Rishabh Tyagi, Sydney (AU); Juan Felix Torres, Darlinghurst (AU); Stefanie Brown, Lewisham (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 219 days.

(21) Appl. No.: 17/772,497

(22) PCT Filed: Oct. 28, 2020

(86) PCT No.: PCT/US2020/057737

§ 371 (c)(1),
(2) Date: Apr. 27, 2022

(87) PCT Pub. No.: WO2021/086965

PCT Pub. Date: May 6, 2021

(65) Prior Publication Data

US 2022/0406318 A1 Dec. 22, 2022

Related U.S. Application Data

(60) Provisional application No. 63/092,830, filed on Oct. 16, 2020, provisional application No. 62/927,772, filed on Oct. 30, 2019.

(51) Int. Cl.
*G10L 19/008* (2013.01)
*G10L 19/032* (2013.01)
*G10L 19/16* (2013.01)

(52) U.S. Cl.
CPC .......... *G10L 19/032* (2013.01); *G10L 19/008* (2013.01); *G10L 19/167* (2013.01)

(58) Field of Classification Search
CPC ... G10L 19/032; G10L 19/008; G10L 19/167; G10L 19/002
See application file for complete search history.

(56) References Cited

U.S. PATENT DOCUMENTS 7,573,912 B2 8/2009 Lindblom
8,442,836 B2 5/2013 Li
(Continued)

FOREIGN PATENT DOCUMENTS

GB 2595891 A * 12/2021 .......... G10L 19/008
JP 2008529056 A 7/2008
(Continued)

OTHER PUBLICATIONS

Dolby Laboratories Inc. "Dolby VRStream audio profile candidate - Description of Bitstream, Decoder, and Renderer plus informative Encoder Description," Jul. 9-13, 2018, Rome, Italy, Jul. 2018 (Year: 2018).*
(Continued)

*Primary Examiner* — Paras D Shah
*Assistant Examiner* — Mulugeta Tuji Dugda

(57) ABSTRACT

Embodiments are disclosed for bitrate distribution in immersive voice and audio services. In an embodiment, a method of encoding an IVAS bitstream comprises: receiving an input audio signal; downmixing the input audio signal into one or more downmix channels and spatial metadata; reading a set of one or more bitrates for the downmix channels and a set of quantization levels for the spatial metadata from a bitrate distribution control table; determining a combination of the one or more bitrates for the downmix channels; determining a metadata quantization level from the set of metadata quantization levels using a bitrate distribution process; quantizing and coding the spatial metadata using the metadata quantization level; generating, using the combination of one or more bitrates, a downmix bitstream for the
(Continued)

one or more downmix channels; combining the downmix bitstream, the quantized and coded spatial metadata and the set of quantization levels into the IVAS bitstream.

10 Claims, 11 Drawing Sheets

(56) References Cited

U.S. PATENT DOCUMENTS

| | | | | |
|---|---|---|---|---|
| 8,918,636 | B2 | 12/2014 | Kiefer | |
| 9,398,337 | B2 | 7/2016 | Lee | |
| 9,530,422 | B2 | 12/2016 | Klejsa | |
| 10,395,664 | B2 | 8/2019 | Tsingos | |
| 10,937,435 | B2 * | 3/2021 | Fueg | G10L 21/04 |
| 11,096,002 | B2 * | 8/2021 | Pihlajakuja | G10L 25/21 |
| 2015/0340044 | A1 | 11/2015 | Kim | |
| 2017/0236521 | A1 | 8/2017 | Chebiyyam et al. | |
| 2019/0013028 | A1 | 1/2019 | Atti | |
| 2019/0103118 | A1 | 4/2019 | Atti | |
| 2019/0251986 | A1 | 8/2019 | Niedermeier | |
| 2019/0295559 | A1 | 9/2019 | Atti | |
| 2022/0279299 | A1 * | 9/2022 | Vasilache | G10L 19/035 |

FOREIGN PATENT DOCUMENTS

| | | | | |
|---|---|---|---|---|
| JP | 2016509260 | A | 3/2016 | |
| RU | 2616774 | C1 | 4/2017 | |
| TW | 201134135 | A | 10/2011 | |
| TW | 201907392 | A | 2/2019 | |
| TW | 201923744 | A | 6/2019 | |
| WO | WO-2007016107 | A2 * | 2/2007 | G10L 19/008 |
| WO | WO-2013186345 | A1 * | 12/2013 | G10L 19/0017 |
| WO | WO-2019023488 | A1 * | 1/2019 | H04L 65/60 |
| WO | 2019056107 | A1 | 3/2019 | |
| WO | 2019068638 | A1 | 4/2019 | |
| WO | 2019105575 | A1 | 6/2019 | |
| WO | 2019106221 | A1 | 6/2019 | |

OTHER PUBLICATIONS

Jürgen Herre, Senior Member, IEEE, Johannes Hilpert, Achim Kuntz, and Jan Plogsties, "Mpeg-H 3D Audio—The New Standard for Coding of Immersive Spatial Audio" IEEE Journal of Selected Topics in Signal Processing, vol. 9, No. 5, Aug. 2015 (Year: 2015).*

Breebaart, J. et al."MPEG Spatial Audio Coding/MPEG Surround: Overview and Current Status" presented at the 119th Convention, Oct. 7-10, 2005, New York, USA, pp. 1-17.

Dolby Laboratories Inc: Dolby VRStream audio profile candidate—Description of Bitstream, Decoder, and Renderer plus informative Encoder Description11 , 3gpp Draft; S4-180806—Dolby Vrstream Audio Candidate—Description of Bitstream, Decoder and Renderer, 3rd Generation Partnership Project (3GPP), Mobile Competence Centre ; 650, Route Des Lucioles; Jul. 9-13, 2018, Rome, Italy.

McGrath D. et al: Immersive Audio Coding for Virtual Reality Using a Metadata-assisted Extension of the 3GPP EVS Codec11 , ICASSP 2019—2019 IEEE International Conference on Acoustics, Speech and Signal Processing (ICASSP), IEEE, May 12, 2019 (May 12, 2019), pp. 730-734.

* cited by examiner

BITRATE DISTRIBUTION IN IMMERSIVE VOICE AND AUDIO SERVICES

CROSS-REFERENCE TO RELATED APPLICATIONS

This application claims priority to U.S. Provisional Patent Application No. 62/927,772, filed 30 Oct. 2019; and U.S. Provisional Patent Application No. 63/092,830, filed 16 Oct. 2020, which are incorporated herein by reference.

TECHNICAL FIELD

This disclosure relates generally to audio bitstream encoding and decoding.

BACKGROUND

Voice and audio encoder/decoder ("codec") standard development has recently focused on developing a codec for immersive voice and audio services (IVAS). IVAS is expected to support a range of audio service capabilities, including but not limited to mono to stereo upmixing and fully immersive audio encoding, decoding and rendering. IVAS is intended to be supported by a wide range of devices, endpoints, and network nodes, including but not limited to: mobile and smart phones, electronic tablets, personal computers, conference phones, conference rooms, virtual reality (VR) and augmented reality (AR) devices, home theatre devices, and other suitable devices. These devices, endpoints and network nodes can have various acoustic interfaces for sound capture and rendering.

SUMMARY

Implementations are disclosed for bitrate distribution in immersive voice and audio services.

In an embodiment, a method of encoding an immersive voice and audio services (IVAS) bitstream, the method comprises: receiving, using one or more processors, an input audio signal; downmixing, using the one or more processors, the input audio signal into one or more downmix channels and spatial metadata associated with one or more channels of the input audio signal; reading, using the one or more processors, a set of one or more bitrates for the downmix channels and a set of quantization levels for the spatial metadata from a bitrate distribution control table; determining, using the one or more processors, a combination of the one or more bitrates for the downmix channels; determining, using the one or more processors, a metadata quantization level from the set of metadata quantization levels using a bitrate distribution process; quantizing and coding, using the one or more processors, the spatial metadata using the metadata quantization level; generating, using the one or more processors and the combination of one or more bitrates, a downmix bitstream for the one or more downmix channels; combining, using the one or more processors, the downmix bitstream, the quantized and coded spatial metadata and the set of quantization levels into the IVAS bitstream; and streaming or storing the IVAS bitstream for playback on an IVAS-enabled device.

In an embodiment, the input audio signal is a four-channel first order Ambisonic (FoA) audio signal, three-channel planar FoA signal or a two-channel stereo audio signal.

In an embodiment, the one or more bitrates are bitrates of one or more channels of a mono audio coder/decoder (codec) bitrates.

In an embodiment, the mono audio codec is an enhanced voice services (EVS) codec and the downmix bitstream is an EVS bitstream.

In an embodiment, obtaining, using the one or more processors, one or more bitrates for the downmix channels and the spatial metadata using a bitrate distribution control table, further comprises: identifying a row in the bitrate distribution control table using a table index that includes a format of the input audio signal, a bandwidth of the input audio signal, an allowed spatial coding tool, a transition mode and a mono downmix backward compatible mode; extracting from the identified row of the bitrate distribution control table, a target bitrate, a bitrate ratio, a minimum bitrate and bitrate deviation steps, wherein the bitrate ratio indicates a ratio in which a total bitrate is to be distributed between the downmix audio signal channels, the minimum bitrate is a value below which the total bitrate is not allowed to go and the bitrate deviation steps are target bitrate reduction steps when a first priority for the downmix signals is higher than or equal to, or lower, than a second priority of the spatial metadata; and determining the one or more bitrates for the downmix channels and the spatial metadata based on the target bitrate, the bitrate ratio, the minimum bitrate and the bitrate deviation steps.

In an embodiment, quantizing the spatial metadata for the one or more channels of the input audio signal using a set of quantization levels quantization is performed in a quantization loop that applies increasingly coarse quantization strategies based on a difference between a target metadata bitrate and an actual metadata bitrate.

In an embodiment, the quantization is determined in accordance with a mono codec priority and a spatial metadata priority based on properties extracted from the input audio signal and channel banded co-variance values.

In an embodiment, the input audio signal is a stereo signal and the downmix signals include a representation of a mid-signal, residuals from the stereo signal and the spatial metadata.

In an embodiment, the spatial metadata includes prediction coefficients (PR), cross-prediction coefficients (C) and decorrelation (P) coefficients for a spatial reconstructor (SPAR) format and prediction coefficients (P) and decorrelation coefficients (PR) for a complex advanced coupling (CACPL) format.

In an embodiment, a method of encoding an immersive voice and audio services (IVAS) bitstream, the method comprises: receiving, using one or more processors, an input audio signal; extracting, using the one or more processors, properties of the input audio signal; computing, using the one or more processors, spatial metadata for channels of the input audio signal; reading, using the one or more processors, a set of one or more bitrates for the downmix channels and a set of quantization levels for the spatial metadata from a bitrate distribution control table; determining, using the one or more processors, a combination of the one or more bitrates for the downmix channels; determining, using the one or more processors, a metadata quantization level from the set of metadata quantization levels using a bitrate distribution process; quantizing and coding, using the one or more processors, the spatial metadata using the metadata quantization level; generating, using the one or more processors and the combination of one or more bitrates, a downmix bitstream for the one or more downmix channels using the one or more bit rates; combining, using the one or more processors, the downmix bitstream, the quantized and coded spatial metadata and the set of quantization levels into the IVAS bitstream; and streaming or storing the IVAS bitstream for playback on an IVAS-enabled device.

In an embodiment, the properties of the input audio signal include one or more of bandwidth, speech/music classification data and voice activity detection (VAD) data.

In an embodiment, the number of downmix channels to be coded into the IVAS bitstream are selected based on a residual level indicator in the spatial metadata.

In an embodiment, a method of encoding an immersive voice and audio services (IVAS) bitstream, further comprises: receiving, using one or more processors, a first order Ambisonic (FoA) input audio signal; extracting, using the one or more processors and an IVAS bitrate, properties of the FoA input audio signal, wherein one of the properties is a bandwidth of the FoA input audio signal; generating, using the one or more processors, spatial metadata for the FoA input audio signal using the FoA signal properties; choosing, using the one or more processors, a number of residual channels to send based on a residual level indicator and decorrelation coefficients in the spatial metadata; obtaining, using the one or more processors, a bitrate distribution control table index based on an IVAS bitrate, bandwidth and a number of downmix channels; reading, using the one or more processors, a spatial reconstructor (SPAR) configuration from a row in the bitrate distribution control table pointed to by the bitrate distribution control table index; determining, using the one or more processors, a target metadata bitrate from the IVAS bitrate, a sum of the target EVS bitrates and a length of the IVAS header; determining, using the one or more processors, a maximum metadata bitrate from the IVAS bitrate, a sum of minimum EVS bitrates and the length of the IVAS header; quantizing, using the one or more processors and a quantization loop, the spatial metadata in a non-time differential manner according to a first quantization strategy; entropy coding, using the one or more processors, the quantized spatial metadata; computing, using the one or more processors, a first actual metadata bitrate; determining, using the one or more processors, whether the first actual metadata bitrate is less than or equal to a target metadata bitrate; and in accordance with the first actual metadata bitrate being less than or equal to the target metadata bitrate, exiting the quantization loop.

In an embodiment, the method further comprises: determining, using the one or more processors, a first total actual EVS bitrate by adding a first amount of bits equal to a difference between the metadata target bitrate and the first actual metadata bitrate to the total EVS target bitrate; generating, using the one or more processors, an EVS bitstream using the first total actual EVS bitrate; generating, using the one or more processors, an IVAS bitstream including the EVS bitstream, the bitrate distribution control table index and the quantized and entropy coded spatial metadata; in accordance with the first actual metadata bitrate being greater than the target metadata bitrate: quantizing, using the one or more processors, the spatial metadata in a time differential manner according to the first quantization strategy; entropy coding, using the one or more processors, the quantized spatial metadata; computing, using the one or more processors, a second actual metadata bitrate; determining, using the one or more processors, whether the second actual metadata bitrate is less than or equal to the target metadata bitrate; and in accordance with the second actual metadata bitrate being less than or equal to the target metadata bitrate, exiting the quantization loop.

In an embodiment, the method further comprises: determining, using the one or more processors, a second total actual EVS bitrate by adding a second amount of bits equal to a difference between the metadata target bitrate and the second actual metadata bitrate to the total EVS target bitrate; generating, using the one or more processors, an EVS bitstream using the second total actual EVS bitrate; generating, using the one or more processors, the IVAS bitstream including the EVS bitstream, the bitrate distribution control table index and the quantized and entropy coded spatial metadata; in accordance with the second actual metadata bitrate being greater than the target metadata bitrate: quantizing, using the one or more processors, the spatial metadata in a non-time differential manner according to the first quantization strategy; coding, using the one or more processors and base2 coder, the quantized spatial metadata; computing, using the one or more processors, a third actual metadata bitrate; and in accordance with the third actual metadata bitrate being less than or equal to the target metadata bitrate, exiting the quantization loop.

In an embodiment, the method further comprises: determining, using the one or more processors, a third total actual EVS bitrate by adding a third amount of bits equal to a difference between the metadata target bitrate and the third actual metadata bitrate to the total EVS target bitrate; generating, using the one or more processors, an EVS bitstream using the third total actual EVS bitrate; generating, using the one or more processors, the IVAS bitstream including the EVS bitstream, the bitrate distribution control table index and the quantized and entropy coded spatial metadata; in accordance with the third actual metadata bitrate being greater than the target metadata bitrate: setting, using the one or more processors, a fourth actual metadata bitrate to be a minimum of the first, second and third actual metadata bitrates; determining, using the one or more processors, whether the fourth actual metadata bitrate is less than or equal to the maximum metadata bitrate; in accordance with the fourth actual metadata bitrate being less than or equal to the maximum metadata bitrate: determining, using the one or more processors, whether the fourth actual metadata bitrate is less than or equal to the target metadata bitrate; and in accordance with the fourth actual metadata bitrate being less than or equal to the target metadata bitrate, exiting the quantization loop.

In an embodiment, the method further comprises: determining, using the one or more processors, a fourth total actual EVS bitrate by adding a fourth amount of bits equal to a difference between the metadata target bitrate and the fourth actual metadata bitrate to the total target EVS bitrate; generating, using the one or more processors, an EVS bitstream using the fourth total actual EVS bitrate; generating, using the one or more processors, the IVAS bitstream including the EVS bitstream, the bitrate distribution control table index and the quantized and entropy coded spatial metadata; and in accordance with the fourth actual metadata bitrate being greater than the target metadata bitrate and less than or equal to the maximum metadata bitrate, exiting the quantization loop.

In an embodiment, the method further comprises: determining, using the one or more processors, a fifth total actual EVS bitrate by subtracting an amount of bits equal to a difference between the fourth actual metadata bitrate and the target metadata bitrate from the total target EVS bitrate; generating, using the one or more processors, an EVS bitstream using the fifth actual EVS bitrate; generating, using the one or more processors, the IVAS bitstream including the EVS bitstream, the bitrate distribution control table index and the quantized and entropy coded spatial metadata; in accordance with the fourth actual metadata bitrate being greater than the maximum metadata bitrate:

changing the first quantization strategy to a second quantization strategy and entering the quantization loop again using the second quantization strategy, where the second quantization strategy is more coarse than the first quantization strategy. In an embodiment, a third quantization strategy can be used that is guaranteed to provide an actual MD bitrate of less than the maximum MD bitrate.

In an embodiment, the SPAR configuration is defined by a downmix string, active W flag, complex spatial metadata flag, spatial metadata quantization strategies, minimum, maximum and target bitrates for one or more instances of an Enhanced Voice Services (EVS) mono coder/decoder (codec) and a time domain decorrelator ducking flag.

In an embodiment, the total actual number of EVS bits is equal to a number of IVAS bits minus a number of header bits minus the actual metadata bitrate, and wherein if the number of total actual EVS bits is less than the total number of EVS target bits then bits are taken from the EVS channels in the following order Z, X, Y and W, and wherein a maximum number of bits that can be taken from any channel is the number of EVS target bits for the channel minus the minimum number of EVS bits for the channel, and wherein if the number of actual EVS bits is greater than the number of EVS target bits then all additional bits are assigned to the downmix channels in the following order: W, Y, X and Z, and the maximum number of additional bits that can be added to any channel is the maximum number of EVS bits minus the number of EVS target bits.

In an embodiment, a method of decoding an immersive voice and audio services (IVAS) bitstream, comprises: receiving, using one or more processors, an IVAS bitstream; obtaining, using one or more processors, an IVAS bitrate from a bit length of the IVAS bitstream; obtaining, using the one or more processors, a bitrate distribution control table index from the IVAS bitstream; parsing, using the one or more processors, a metadata quantization strategy from a header of the IVAS bitstream; parsing and unquantizing, using the one or more processors, the quantized spatial metadata bits based on the metadata quantization strategy; setting, using the one or more processors, an actual number of enhanced voice services (EVS) bits equal to a remaining bit length of the IVAS bitstream; reading, using the one or more processors and the bitrate distribution control table index, table entries of the bitrate distribution control table that contain an EVS target, and EVS minimum bitrate and a maximum EVS bitrate for one or more EVS instances; obtaining, using the one or more processors, an actual EVS bitrate for each downmix channel; and decoding, using the one or more processors, each EVS channel using the actual EVS bitrate for the channel; and upmixing, using the one or more processors, the EVS channels to first order Ambisonic (FoA) channels.

In an embodiment, a system comprises: one or more processors; and a non-transitory computer-readable medium storing instructions that, upon execution by the one or more processors, cause the one or more processors to perform operations of any one of the methods described above.

In an embodiment, a non-transitory, computer-readable medium storing instructions that, upon execution by one or more processors, cause the one or more processors to perform operations of any one of the methods described above.

Other implementations disclosed herein are directed to a system, apparatus and computer-readable medium. The details of the disclosed implementations are set forth in the accompanying drawings and the description below. Other features, objects and advantages are apparent from the description, drawings and claims.

Particular implementations disclosed herein provide one or more of the following advantages. An IVAS codec bitrate is distributed between a mono codec and spatial metadata (MD) and between multiple instances of mono codec. For a given audio frame, the IVAS codec determines a spatial audio coding mode (parametric or residual coding). The IVAS bitstream is optimized to reduce the spatial MD, reduce mono codec overhead and minimize bit wastage to zero.

DESCRIPTION OF DRAWINGS

In the drawings, specific arrangements or orderings of schematic elements, such as those representing devices, units, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some implementations.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths, as may be needed, to affect the communication.

The same reference symbol used in various drawings indicates like elements.

DETAILED DESCRIPTION

In the following detailed description, numerous specific details are set forth to provide a thorough understanding of the various described embodiments. It will be apparent to one of ordinary skill in the art that the various described implementations may be practiced without these specific details. In other instances, well-known methods, procedures, components, and circuits, have not been described in detail so as not to unnecessarily obscure aspects of the embodiments. Several features are described hereafter that can each be used independently of one another or with any combination of other features.

Nomenclature

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." The terms "determined," "determines," or "determining" are to be read as obtaining, receiving, computing, calculating, estimating, predicting or deriving. In addition, in the following description and claims, unless defined otherwise, all technical and scientific terms used herein have the same meaning as commonly understood by one of ordinary skills in the art to which this disclosure belongs.

IVAS Use Case Examples

Figure 1:
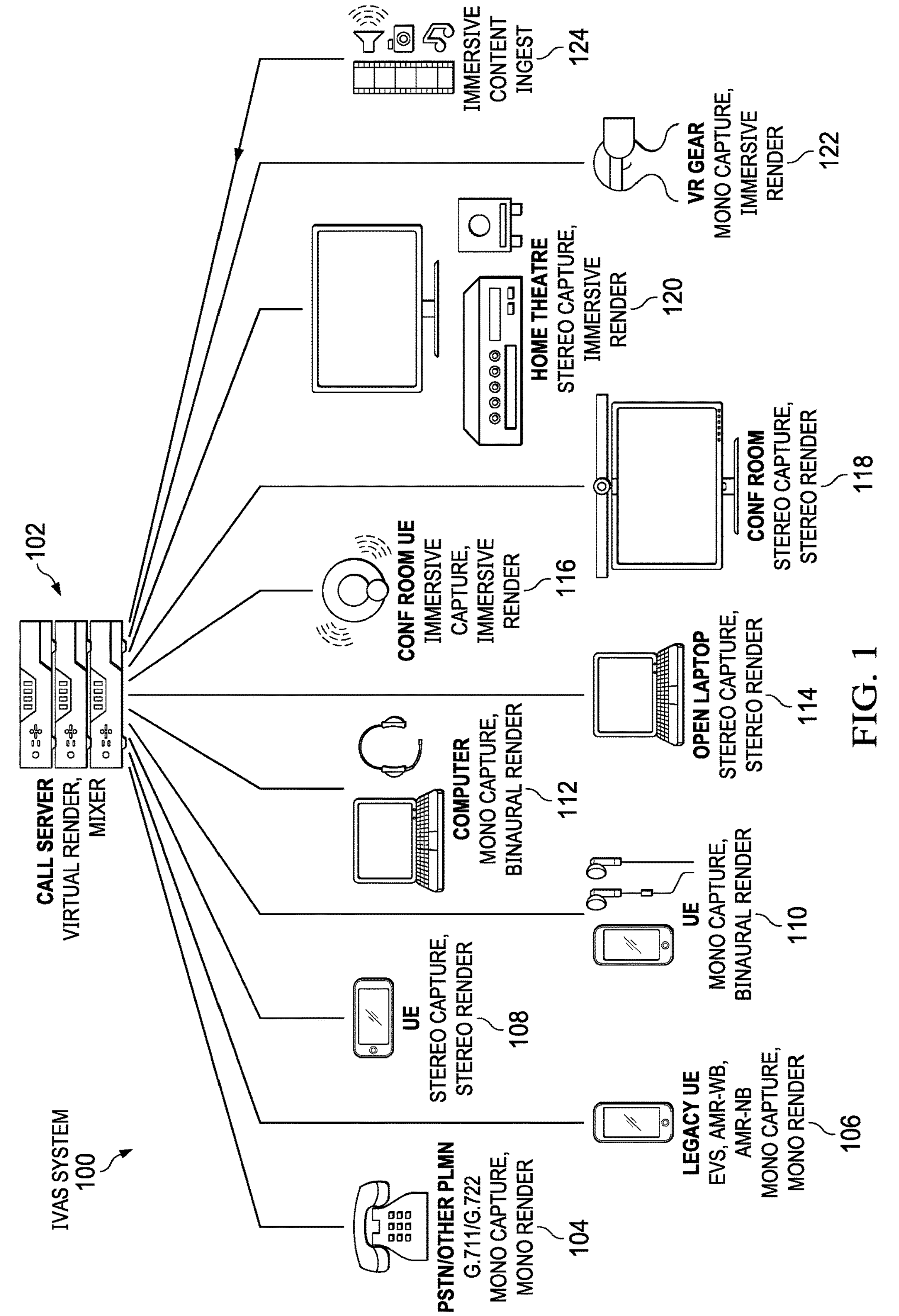
FIG. 1 illustrates use cases for an IVAS codec, according to an embodiment.

FIG. 1 illustrates use cases 100 for an IVAS codec 100, according to one or more implementations. In some implementations, various devices communicate through call server 102 that is configured to receive audio signals from, for example, a public switched telephone network (PSTN) or a public land mobile network device (PLMN) illustrated by PSTN/OTHER PLMN 104. Use cases 100 support legacy devices 106 that render and capture audio in mono only, including but not limited to: devices that support enhanced voice services (EVS), multi-rate wideband (AMR-WB) and adaptive multi-rate narrowband (AMR-NB). Use cases 100 also support user equipment (UE) 108, 114 that captures and renders stereo audio signals, or UE 110 that captures and binaurally renders mono signals into multichannel signals. Use cases 100 also |support|$_{[BS1]}$immersive and stereo signals captured and rendered by video conference room systems 116, 118, respectively. Use cases 100 also support stereo capture and immersive rendering of stereo audio signals for home theatre systems 120, and computer 112 for mono capture and immersive rendering of audio signals for virtual reality (VR) gear 122 and immersive content ingest 124.

Example IVAS Encoding/Decoding Systems

Figure 2:
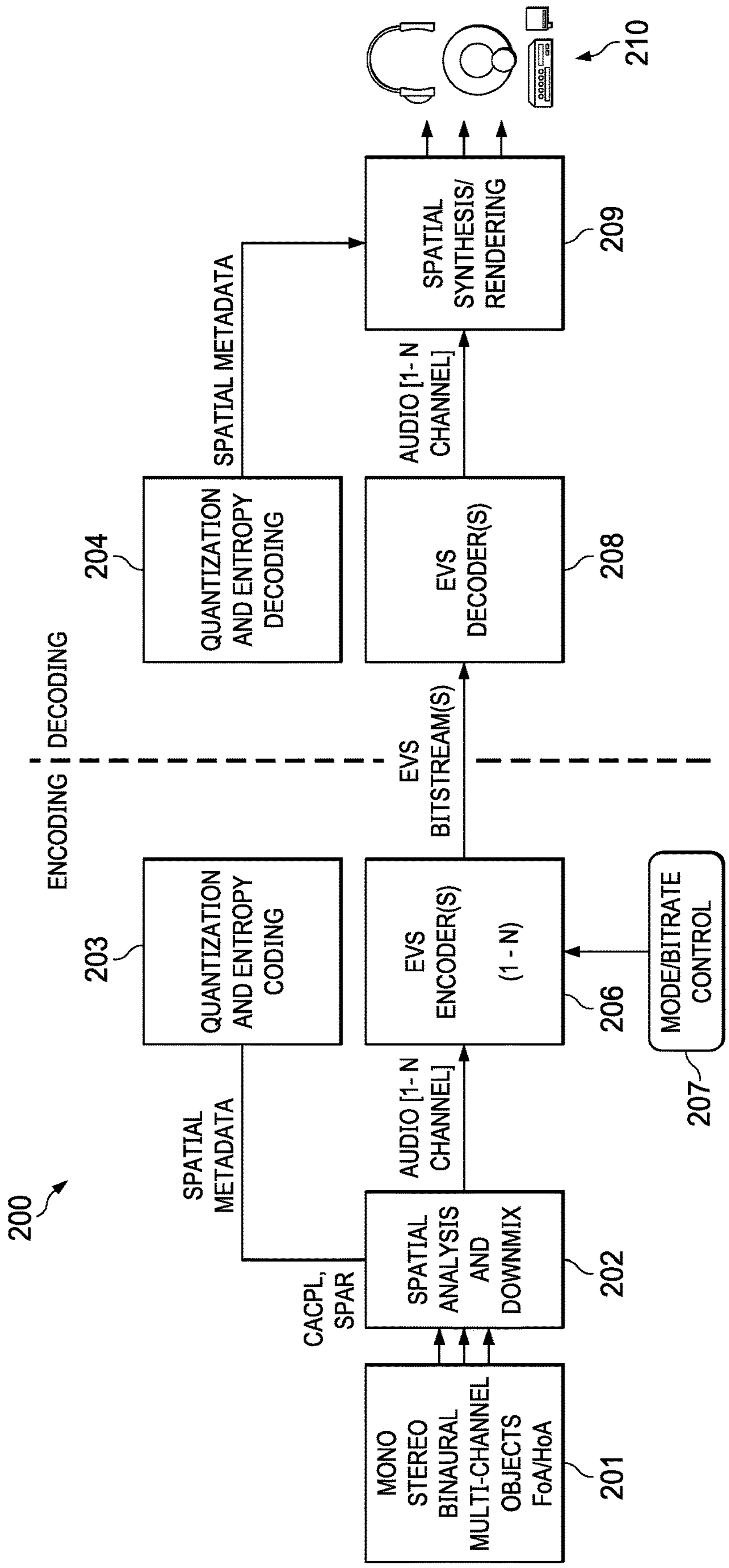
FIG. 2 is a block diagram of a system for encoding and decoding IVAS bitstreams, according to an embodiment.

FIG. 2 is a block diagram of a system 200 for encoding and decoding IVAS bitstreams, according to one or more implementations. For encoding, an IVAS encoder includes spatial analysis and downmix unit 202 that receives audio data 201, including but not limited to: mono signals, stereo signals, binaural signals, spatial audio signals (e.g., multi-channel spatial audio objects), FoA, higher order Ambisonics (HoA) and any other audio data. In some implementations, spatial analysis and downmix unit 202 implements complex advanced coupling (CACPL) for analyzing/downmixing stereo/FoA audio signals and/or SPAR for analyzing/downmixing FoA audio signals. In other implementations, spatial analysis and downmix unit 202 implements other formats.

The output of spatial analysis and downmix unit 202 includes spatial metadata, and 1-N downmix channels of audio, where N is the number of input channels. The spatial metadata is input into quantization and entropy coding unit 203 which quantizes and entropy codes the spatial data. In some implementations, quantization can include several levels of increasingly coarse quantization such as, for example, fine, moderate, coarse and extra coarse quantization strategies and entropy coding can include Huffman or Arithmetic coding. Enhanced voice services (EVS) encoding unit 206 encodes the 1-N channels of audio into one or more EVS bitstreams.

In some implementations, EVS encoding unit 206 complies with 3GPP TS 26.445 and provides a wide range of functionalities, such as enhanced quality and coding efficiency for narrowband (EVS-NB) and wideband (EVS-WB) speech services, enhanced quality using super-wideband (EVS-SWB) speech, enhanced quality for mixed content and music in conversational applications, robustness to packet loss and delay jitter and backward compatibility to the AMR-WB codec. In some implementations, EVS encoding unit 206 includes a pre-processing and mode selection unit that selects between a speech coder for encoding speech signals and a perceptual coder for encoding audio signals at a specified bitrate based on mode/bitrate control 207. In some implementations, the speech encoder is an improved variant of algebraic code-excited linear prediction (ACELP), extended with specialized linear prediction (LP)-based modes for different speech classes. In some implementations, the audio encoder is a modified discrete cosine transform (MDCT) encoder with increased efficiency at low delay/low bitrates and is designed to perform seamless and reliable switching between the speech and audio encoders.

In some implementations, an IVAS decoder includes quantization and entropy decoding unit 204 configured to recover the spatial metadata, and EVS decoder(s) 208 configured to recover the 1-N channel audio signals. The recovered spatial metadata and audio signals are input into spatial synthesis/rendering unit 209, which synthesizes/renders the audio signals using the spatial metadata for playback on various audio systems 210.

Example IVAS/SPAR CODEC

Figure 3:
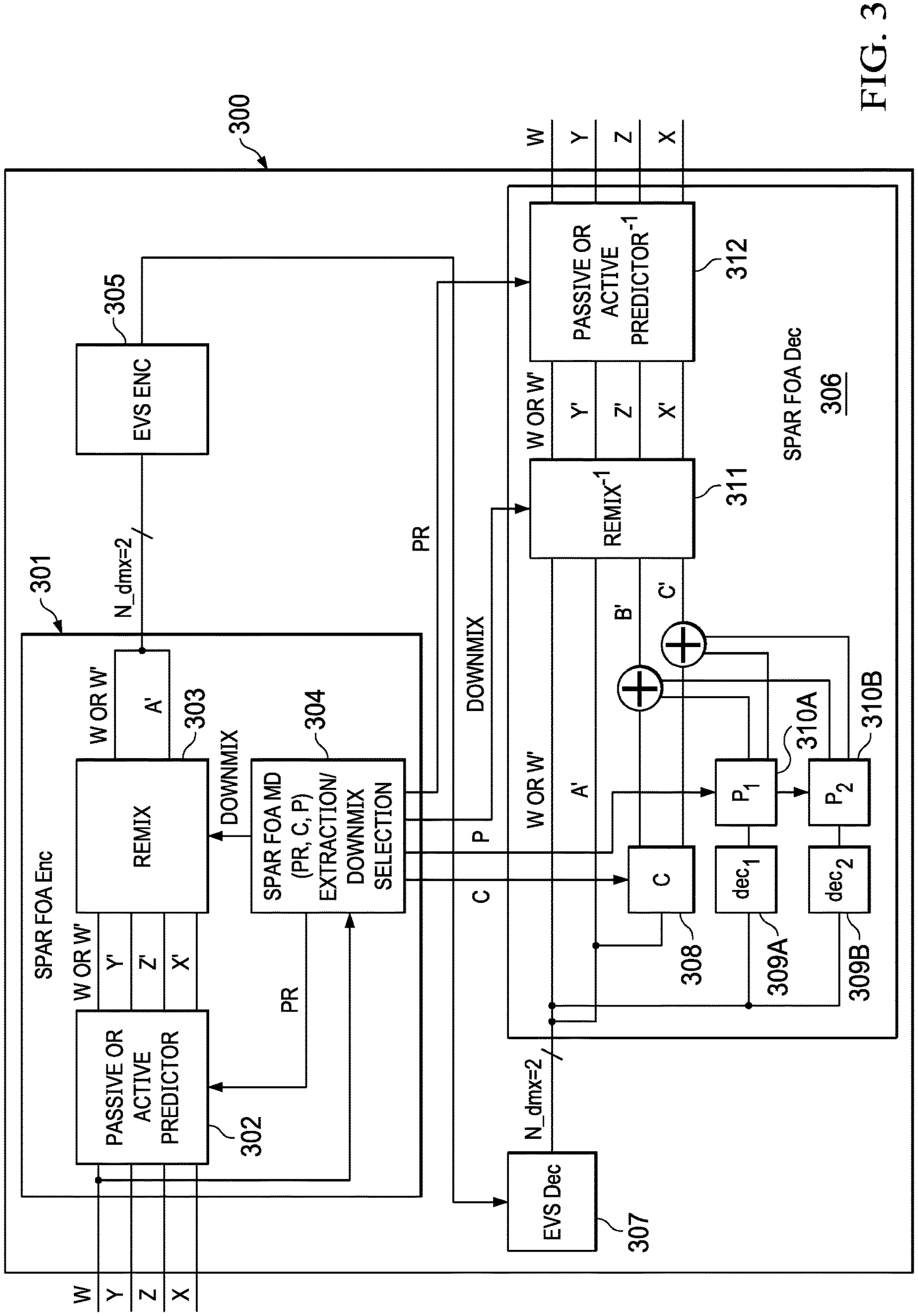
FIG. 3 is a block diagram of a spatial reconstructor (SPAR) first order Ambisonics (FoA) coder/decoder ("codec") for encoding and decoding IVAS bitstreams in FoA format, according to an embodiment.

FIG. 3 is a block diagram of FoA codec 300 for encoding and decoding FoA in SPAR format, according to some implementations. FoA codec 300 includes SPAR FoA encoder 301, EVS encoder 305, SPAR FoA decoder 306 and EVS decoder 307. SPAR FoA encoder 301 converts a FoA input signal into a set of downmix channels and parameters used to regenerate the input signal at SPAR FoA decoder 306. The downmix signals can vary from 1 to 4 channels and the parameters include prediction coefficients (PR), cross-prediction coefficients (C), and decorrelation coefficients (P). Note that SPAR is a process used to reconstruct an audio signal from a downmix version of the audio signal using the PR, C and P parameters, as described in further detail below.

Note that the example implementation shown in FIG. 3 depicts a nominal 2-channel downmix, where the W (passive prediction) or W (active prediction) channel is sent with a single predicted channel Y' to decoder 306. In some implementations, W can be an active channel. An active W channel allows some mixing of X, Y, Z channels into the W channel as follows:

$$W'=W+f^*pr_y^*Y+f^*pr_z^*Z+f^*pr_x^*X,$$

where f is a constant (e.g. 0.5) that allows mixing of some of the X, Y, Z channels into the W channel and $pr_y$, $pr_x$ and $pr_z$ are the prediction (PR) coefficients. In passive W, f=0 so there is no mixing of X, Y, Z channels into the W channel.

The cross-prediction coefficients (C) allow some portion of the parametric channels to be reconstructed from the residual channels, in the cases where at least one channel sent as a residual and at least one is sent parametrically, i.e. for 2 and 3 channel downmixes. For two channel downmixes (as described in further detail below), the C coefficients allow some of the X and Z channels to be reconstructed from Y', and the remaining channels are reconstructed by decorrelated versions of the W channel, as described in further detail below. In the 3 channel downmix case, Y' and X' are used to reconstruct Z alone.

In some implementations, SPAR FoA encoder 301 includes passive/active predictor unit 302, remix unit 303 and extraction/downmix selection unit 304. Passive/active predictor receives FoA channels in a 4-channel B-format (W, Y, Z, X) and computes downmix channels (representation of W, Y', Z', X').

Extraction/downmix selection unit 304 extracts SPAR FoA metadata from a metadata payload section of the IVAS bitstream, as described in more detail below. Passive/active predictor unit 302 and remix unit 303 use the SPAR FoA metadata to generate remixed FoA channels (W or W and A'), which are input into EVS encoder 305 to be encoded into an EVS bitstream, which is encapsulated in the WAS bitstream sent to decoder 306. Note in this example the Ambisonic B-format channels are arranged in the AmbiX convention. However, other conventions, such as the Furse-Malham (FuMa) convention (W, X, Y, Z) can be used as well.

Referring to SPAR FoA decoder 306, the EVS bitstream is decoded by EVS decoder 307 resulting in N_dmx (e.g., N_dmx=2) downmix channels. In some implementations, SPAR FoA decoder 306 performs a reverse of the operations performed by SPAR encoder 301. For example, in the example of FIG. 3 the remixed FoA channels (representation of W, A', B', C") are recovered from the 2 downmix channels using the SPAR FoA spatial metadata. The remixed SPAR FoA channels are input into inverse mixer 311 to recover the SPAR FoA downmix channels (representation of W, Y', Z', X'). The predicted SPAR FoA channels are then input into inverse predictor 312 to recover the original unmixed SPAR FoA channels (W, Y, Z, X).

Note that in this two-channel example, decorrelator blocks 309A ($dec_1$) and 309B ($dec_2$) are used to generate decorrelated versions of the W channel using a time domain or frequency domain decorrelator. The downmix channels and decorrelated channels are used in combination with the SPAR FoA metadata to reconstruct fully or parametrically the X and Z channels. C block 308 refers to the multiplication of the residual channel by the 2×1 C coefficient matrix, creating two cross-prediction signals that are summed into the parametrically reconstructed channels, as shown in FIG. 3. $P_1$ block 310A and $P_2$ block 310B refer to multiplication of the decorrelator outputs by columns of the 2×2 P coefficient matrix, creating four outputs that are summed into the parametrically reconstructed channels, as shown in FIG. 3.

In some implementations, depending on the number of downmix channels one of the FoA inputs is sent to SPAR FoA decoder 306 intact (the W channel), and one to three of the other channels (Y, Z, and X) are either sent as residuals or completely parametrically to SPAR FoA decoder 306. The PR coefficients, which remain the same regardless of the number of downmix channels N, are used to minimize predictable energy in the residual downmix channels. The C coefficients are used to further assist in regenerating fully parametrized channels from the residuals. As such, the C coefficients are not required in the one and four channel downmix cases, where there are no residual channels or parameterized channels to predict from. The P coefficients are used to fill in the remaining energy not accounted for by the PR and C coefficients. The number of P coefficients is dependent on the number of downmix channels N in each band. In some implementations, SPAR PR coefficients (Passive W only) are calculated as follows.

Step 1. Predict all side signals (Y, Z, X) from the main W signal using Equation [1].

$$\begin{bmatrix} W \\ Y' \\ Z' \\ X' \end{bmatrix} = \begin{bmatrix} 1 & 0 & 0 & 0 \\ -pr_Y & 1 & 0 & 0 \\ -pr_Z & 0 & 1 & 0 \\ -pr_X & 0 & 0 & 1 \end{bmatrix} \begin{bmatrix} W \\ Y \\ Z \\ X \end{bmatrix}, \quad [1]$$

where, as an example, the prediction parameter for the predicted channel Y' is calculated using Equation [2].

$$pr_Y = \frac{R_{YW}}{\max(R_{WW}, \epsilon)} \frac{1}{\max\left(1, \sqrt{|R_{YY}|^2 + |R_{ZZ}|^2 + |R_{XX}|^2}\right)}, \quad [2]$$

where $R_{AB}$=cov(A, B) are elements of the input covariance matrix corresponding to signals A and B, and can be computed per band. Similarly, the Z' and X' residual channels have corresponding prediction parameters, prz and prx. PR is the vector of the prediction coefficients $[pr_Y, pr_Z, pr_X]^T$.

Step 2. Remix the W and predicted (Y', Z', X') signals from most to least acoustically relevant, wherein "remixing" means reordering or re-combining signals based on some methodology, $$\begin{bmatrix} W \\ A' \\ B' \\ C' \end{bmatrix} = [\text{ remix }] \begin{bmatrix} W' \\ Y' \\ Z' \\ X' \end{bmatrix}. \quad [3]$$

One implementation of remixing is re-ordering of the input signals to W, Y', X', Z', given the assumption that audio cues from left and right are more acoustically relevant than front-back, and front-back cues are more acoustically relevant than up-down cues.

Step 3. Calculate the covariance of the 4 channel post-prediction and remixing downmix as shown in Equations [4] and [5].

$$R_{pr} = [\text{remix}]PR.R.PR^{H}[\text{remix}], \quad [4]$$

$$R_{pr} = \begin{pmatrix} R_{WW} & R_{Wd} & R_{Wu} \\ R_{dW} & R_{dd} & R_{du} \\ R_{uW} & R_{ud} & R_{uu} \end{pmatrix}. \quad [5]$$

where d represents the residual channels (i.e., 2nd to N_dmx channels), and u represents the parametric channels that need to be wholly regenerated (i.e. (N_dmx+1)th to 4th channels).

For the example of a WABC downmix with 1-4 channels, d and u represent the following channels shown in Table I:

TABLE I

| d and u channel representations | | |
|---|---|---|
| N | d channels | U channels |
| 1 | — | A', B', C' |
| 2 | A' | B', C' |
| 3 | A', B' | C' |
| 4 | A', B', C' | — |

Of main interest to the calculation of SPAR FoA metadata are the R_dd, R_ud and R_uu quantities. From the R_dd, R_ud and R_uu quantities, the codec 300 determines if it is possible to cross-predict any remaining portion of the fully parametric channels from the residual channels being sent to the decoder. In some implementations, the required extra C coefficients are given by:

$$C=R_{ud}(R_{dd}+I\max(\epsilon,tr(R_{dd})*0.005))^{-1}. \quad [6]$$

Therefore, the C parameter has the shape (1×2) for a 3-channel downmix, and (2×1) for a 2-channel downmix.

Step 4. Calculate the remaining energy in parameterized channels that must be reconstructed by decorrelators 309A, 309B. The residual energy in the upmix channels Res_uu is the difference between the actual energy R_uu (post-prediction) and the regenerated cross-prediction energy Reg_uu.

$$Reg_{uu} = CR_{dd}C^{H}, \quad [7]$$

$$Res_{uu} = R_{uu} - Reg_{uu} \quad [8]$$

$$P = \sqrt{\frac{Res_{uu}}{\max\left(\epsilon, R_{WW}, \sqrt{tr(|Res_{uu}|)}\right)}}. \quad [9]$$

In an embodiment, the matrix square root is taken after the normalized $Res_{uu}$ matrix has had its off-diagonal elements set to zero. P is also a covariance matrix, hence is Hermitian symmetric, and thus only parameters from the upper or lower triangle need be sent to decoder 306. The diagonal entries are real, while the off-diagonal elements may be complex. In an embodiment, the P coefficients can be further separated into diagonal and off-diagonal elements P_d and P_o.

Example IVAS Signal Chain (FoA or Stereo Input)

Figure 4A:
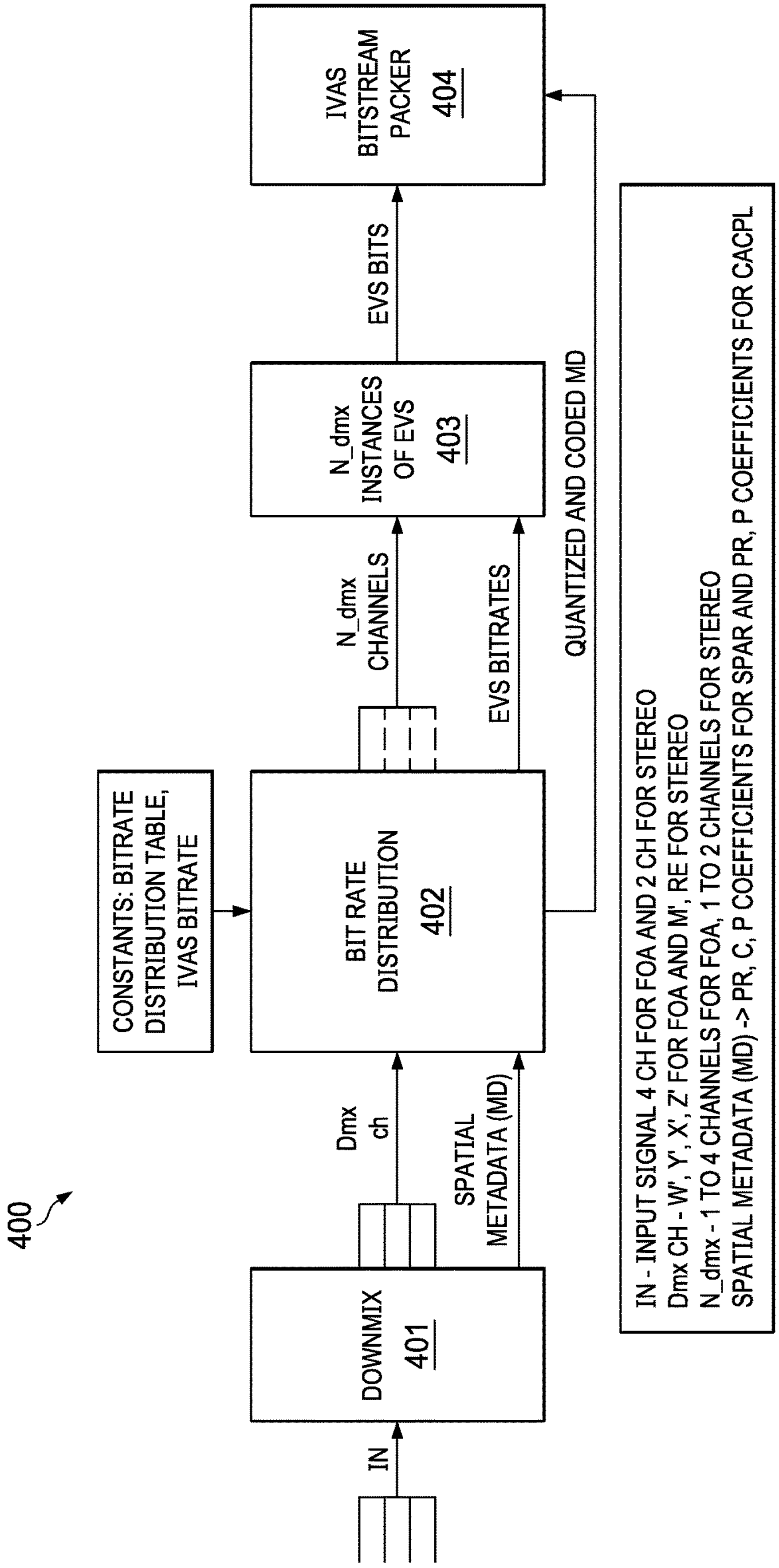
FIG. 4A is a block diagram of an IVAS signal chain for FoA and stereo input signals, according to an embodiment.

FIG. 4A is a block diagram of an IVAS signal chain 400 for FoA and stereo input audio signals, according to an embodiment. In this example configuration, the audio input to the signal chain 400 can be a 4-channel FoA audio signal or a 2-channel stereo audio signal. Downmix unit 401 generates downmix audio channels (dmx_ch) and spatial MD. The downmix channels are input into bitrate (BR) distribution unit 402 which is configured to quantize the spatial MD and provide mono codec bitrates for the downmix audio channels using a BR distribution control table and IVAS bitrate, as described in detail below. The output of BR distribution unit 402 is input into EVS unit 403, which encodes the downmix audio channels into an EVS bitstream. The EVS bitstream and the quantized and coded spatial MD are input into IVAS bitstream packer 404 to form an IVAS bitstream, which is transmitted to an IVAS decoder and/or stored for subsequent processing or playback on one or more IVAS devices.

For stereo input signals, downmix unit 401 is configured to generate a representation of mid signal (M'), residuals (Re) from the stereo signal and spatial MD. The spatial MD includes PR, C and P coefficients for SPAR and PR and P coefficients for CACPL, as described more fully below. The M' signal, Re, spatial MD and a BR distribution control table are input into BR (Bit Rate) distribution unit 402 which is configured to quantize the spatial metadata and provide mono codec bitrates for downmix channels using the signal characteristics of the M' signal and the BR distribution control table. The M' signal, Re and mono codec BRs are input into EVS unit 403, which encodes the M' signal and Re into an EVS bitstream. The EVS bitstream and the quantized and coded spatial MD are input into IVAS bitstream packer 404 to form an IVAS bitstream, which is transmitted to an IVAS decoder and/or stored for subsequent processing or playback on one or more IVAS devices.

For FoA input signals, downmix unit 401 is configured to generate 1 to 4 FoA downmix channels W', Y', X' and Z' and spatial MD. The spatial MD includes PR, C and P coefficients for SPAR and PR and P coefficients for CACPL, as described more fully below. The 1 to 4 FoA downmix channels (W', Y', X', Z') are input into BR distribution unit 402, which is configured to quantize the spatial MD and provide mono codec bitrates for the FoA downmix channel(s) using the signal characteristics of the FoA downmix channel(s) and the BR distribution control table. The FoA downmix channel(s) is/are input into EVS unit 403, which encodes the FoA downmix channel(s) into an EVS bitstream. The EVS bitstream and the quantized and coded spatial MD are input into IVAS bitstream packer 495-404 to form an IVAS bitstream, which is transmitted to an IVAS decoder and/or stored for subsequent processing or playback on one or more IVAS devices. The IVAS decoder can perform the reverse of the operations performed by the IVAS encoder to reconstruct the input audio signals for playback on the IVAS device.

Figure 4B:
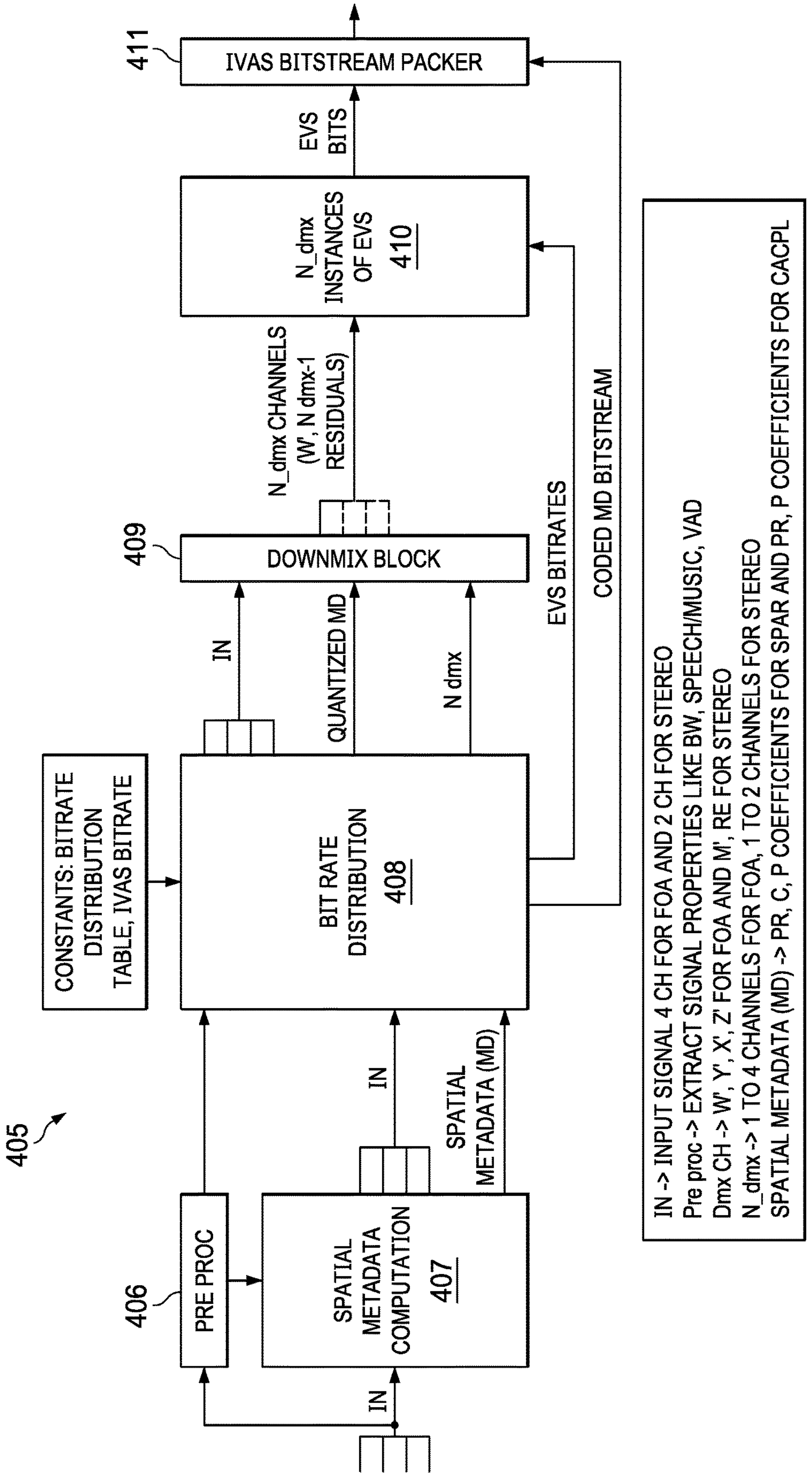
FIG. 4B is a block diagram of an alternative IVAS signal chain for FoA and stereo input signals, according to an embodiment.

FIG. 4B is a block diagram of an alternative IVAS signal chain 405 for FoA and stereo input audio signals, according to an embodiment. In this example configuration, the audio input to the signal chain 405 can be a 4-channel FoA audio signal or a 2-channel stereo audio signal. In this embodiment, pre-processor 406 extracts signal properties from the input audio signals, such as bandwidth (BW), speech/music classification data, voice activity detection (VAD) data, etc.

Spatial MD unit 407 generates spatial MD from the input audio signal using the extracted signal properties. The input audio signal, signal properties and spatial MD are input into BR distribution unit 408 which is configured to quantize the spatial MD and provide mono codec bitrates for the downmix audio channels using a BR distribution control table and IVAS bitrate described in detail below.

The input audio signals, quantized spatial MD and number of downmix channels (d_dmx) output by BR distribution unit 408 are input into downmix unit 409, which generates the downmix channel(s). For example, for FoA signals the downmix channels can include W and N_dmx−1 residuals (Re).

The EVS bitrates output by BR distribution unit 408 and the downmix channel(s) are input into EVS unit 410, which encodes the downmix channel(s) into an EVS bitstream. The EVS bitstream and the quantized, coded spatial MD are input into IVAS bitstream packer 411 to form an IVAS bitstream, which is transmitted to an IVAS decoder and/or stored for subsequent processing or playback on one or more IVAS devices. The IVAS decoder can perform the reverse of the operations performed by the IVAS encoder to reconstruct the input audio signals for playback on the IVAS device.

Example Bitrate Distribution Control Strategy

In an embodiment, an IVAS bitrate distribution control strategy includes two components. The first component is the BR distribution control table that provides initial conditions for the BR distribution control process. The index to the BR distribution control table is determined by the codec configuration parameters. The codec configuration parameters can include IVAS bitrate, input format such as stereo, FoA, planar FoA or any other format, audio bandwidth (BW), spatial coding mode (or number of residual channels $N_{re}$), priority of mono codec and spatial MD. For stereo coding $N_{re}=0$ corresponds to full-parametric (FP) mode and $N_{re}=1$ corresponds to mid-residual (MR) mode. In an embodiment, the BR distribution control table index points to the target, the minimum and maximum mono codec bitrates for each of the downmix channels, and multiple quantization strategies (e.g., fine, medium coarse, coarse) to code the spatial MD. In another embodiment, the BR distribution control table index points to the total target and minimum bitrate for all mono codec instances, a ratio in which the available bitrate needs to be divided between all downmix channels, and multiple quantization strategies to code the spatial MD. The second component of the IVAS bitrate distribution control strategy is a process that uses the BR distribution control table outputs and input audio signal properties to determine spatial metadata quantization levels and bitrate and a bitrate of each downmix channel, as described in reference to FIGS. 5A and 5B.

Bitrate Distribution Process—Overview

The main processing components of the bitrate distribution processes disclosed herein include:

- Audio bandwidth (BW) detection (e.g., narrow band (NB), wide band (WB), super wide band (SWB), full band (FB)). In this step, the BW of the mid or W signal is detected, and metadata is quantized accordingly. EVS then treats IVAS BW as an upper limit and codes the downmix channels accordingly
- Inputs audio signal properties extraction (e.g., speech or music)
- Spatial coding mode (e.g., full parametric (FP), mid residual (MR)) or a number of residual channels selection, N_re, where for stereo coding FP mode is selected when N_re=0, and MR mode is selected when N_re=1
- Mono codec and spatial MD priority decisionTarget bitrate, minimum and maximum bitrates for each downmix channel or the ratios in which the total mono codec bitrate is to be divided between the downmix channels

Audio BW Detection

This component detects the BW of the mid or W signal. In embodiment, the IVAS codec uses the EVS BW detector described in EVS TS 26.445.

Input Signal Properties Extraction

This component classifies each frame of the input audio signal as speech or music. In an embodiment, the IVAS codec uses the EVS speech/music classifier, as described in EVS TS 26.445.

Mono Codec Versus Spatial MD Priority Decision

This component decides the priority of the mono codec versus the spatial MD based on downmix signal properties. Examples of downmix signal properties include speech or music as determined by the speech/music classifier data and mid-side (M-S) banded covariance estimates for stereo, and W-Y, W-X, W-Z banded covariance estimates for FoA. The speech/music classifier data can be used to give a higher priority to the mono codec if the input audio signal is music, and the covariance estimates can be used to give more priority to spatial MD when the input audio signal is hard-panned left or right.

In an embodiment, the priority decision is calculated for each frame of the input audio signal. For a given IVAS bitrate, mid or W signal BW and input configuration, bitrate distribution starts with a target or desired bitrates for the downmix channels (e.g., the mono codec bitrate is decided upon subjective or objective evaluation) present in the BR distribution control table and the finest quantization strategy for metadata. If the initial condition does not fit within the given IVAS bitrate budget, then the mono codec bitrate or quantization level of spatial MD or both are reduced iteratively in a quantization loop based on their respective priorities until both of them fit within the IVAS bitrate budget.

Bitrate Distribution Between Downmix Channels

Full Parametric Vs. Mid-Residual

In FP mode, only the M' or W channel is coded by a mono codec and additional parameters are coded in the spatial MD indicating the level of the residual channel or level of decorrelation to be added by the decoder. For bitrates where both FP and MR are feasible, the IVAS BR distribution process dynamically selects a number of residual channels to be coded by the mono codec and transmitted/streamed to the decoder based on the spatial MD on a frame by frame basis. If the level of any residual channel is higher than a threshold then that residual channel is coded by the mono codec; otherwise, the process runs in FP mode. Transition frame handling is performed to reset the codec state buffers when the number of residual channels to be coded by the mono codec changes.

MR Downmix Bitrate Distribution

Listening evaluation has been done with various input signals and bitrate distributions between the mid channel and the residual channel. Based on focused listening tests, the most effective mid to residual bitrate ratio is 3:2. Other ratios however can be used based on the requirements of the application. In an embodiment, bitrate distribution uses a fixed ratio which is tuned further in a tuning phase. During the iterative process of choosing the quantization strategy and BRs for downmix channels, the BR for each downmix channel is modified as per the given ratio.

In an embodiment, instead of maintaining a fixed ratio between downmix channel bitrates, the target bitrate and min and max bitrates for each downmix channel are separately listed in the BR distribution control table. These bitrates are chosen based on careful subjective and objective evaluations. During the iterative process of choosing the quantization strategy and BRs for the downmix channels, bits are added to or taken from the downmix channels based on the priority of all the downmix channels. The priority of the downmix channels can be fixed or dynamic on frame by frame basis. In an embodiment, the priority of the downmix channels is fixed.

Bitrate Distribution Process—Process Flow

Figure 5A:
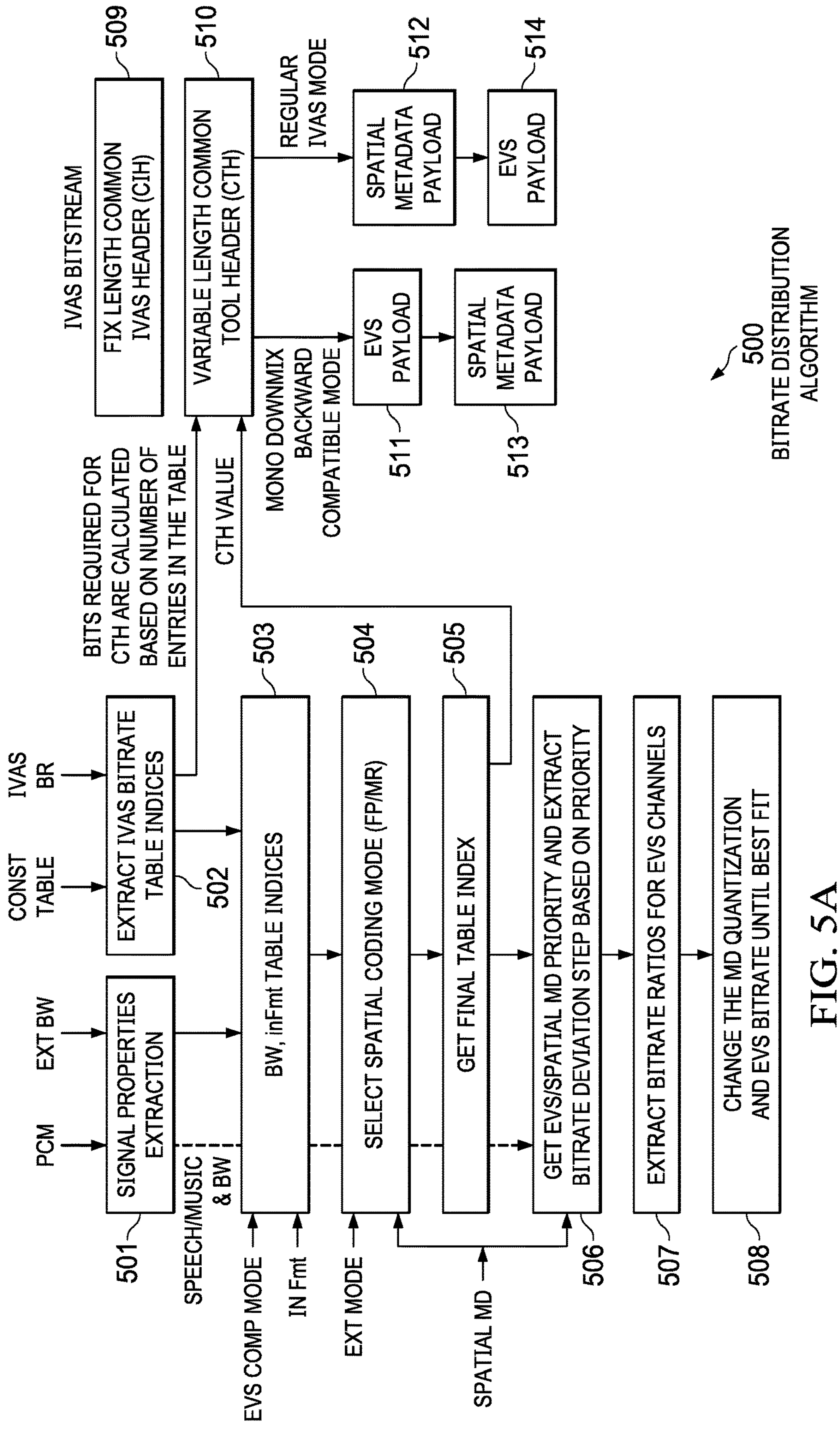
FIG. 5A is a flow diagram of a bitrate distribution process for stereo, planar FoA and FoA input signals, according to an embodiment.

FIG. 5A is a flow diagram of a bitrate distribution process 500 for stereo and FoA input signals, according to an embodiment. The inputs to process 500 are IVAS bitrate, constants (e.g., bitrate distribution control table, IVAS bitrate), downmix channels, spatial MD, input format (e.g., stereo, FoA, Planar FoA) and forced command line parameters (e.g., max bandwidth, coding mode, mono downmix EVS backward compatible mode). The outputs of process 500 are EVS bitrate for each downmix channel, metadata quantization levels and encoded metadata bits. The following steps are executed as part of process 500.

Downmix Audio Feature Extraction

In Step 501, the following signal properties are extracted from the input audio signal: bandwidth (e.g., narrowband, wideband, super wideband, full band) and speech/music classification data, voice activity detection (VAD) data. The bandwidth (BW) is the minimum of the actual bandwidth of the input audio signal and a command line maximum bandwidth specified by a user. In an embodiment, the downmix audio signal can be in pulse code modulated (PCM) format.

Determine Table Index

In Step 502, process 500 extracts the IVAS bitrate distribution control table indices from an IVAS bitrate distribution control table using the IVAS bitrate. In Step 503, process 500 determines the input format table indices based on the signal parameters extracted in Step 501 (i.e., BW and speech/music classification), the input audio signal format, the IVAS bitrate distribution control table indices extracted in Step 502 and an EVS mono downmix backward compatibility mode. In Step 504, process 500 selects the spatial coding mode (i.e., FP or MR) or number of residual channels (i.e., N_re=0 to 3) based on the bitrate distribution control table indices, a transition audio coding mode and spatial MD. In Step 505, process 500 determines the final exact table index based on the six parameters described above. In an embodiment, the selection of the spatial audio coding mode in step 504 is based on a residual channel level indicator in the spatial MD. The spatial audio coding mode indicates either an MR coding mode, where the representation of mid or W channel (M' or W) is accompanied with one or more residual channels in the downmixed audio signal, or an FP coding mode, where only the representation of the mid or W channel (M' or W) is present in the downmixed audio signal. In an embodiment, the transition audio coding mode is set to 1 if the spatial audio coding mode in a previous frame included residual channels coding while the current frame requires only M' or W channel coding. Otherwise, the transition audio coding mode is set to 0. If the number of residual channels to be coded is different between the current frame and previous frame, the transition audio coding mode is set to 1.

Compute Mono Codec and Spatial MD Priority

In Step 506, process 500 determines a mono codec/spatial MD priority based on the input audio signal properties extracted in Step 1 and mid-side or W-Y, W-X, W-Z channel banded co-variance estimates. In an embodiment, there are four possible priority outcomes: mono codec high priority and spatial MD low priority, mono codec low priority and spatial MD high priority, mono codec high priority and spatial MD high priority; and mono codec low priority and spatial MD low priority.

Extract Mono Codec Bitrate Related Variables from Table

In Step 507, the following parameters are read from the table entry pointed to by the final table index calculated in Step 505: mono codec (EVS) target bitrate, bitrate ratio, EVS min bitrate and EVS bitrate deviation steps. The actual mono codec (EVS) bitrate may be higher or lower than mono codec (EVS) target bitrate specified in the BR distribution control table depending on the mono codec/spatial MD priority determined in Step 506 and the spatial MD bitrate with various quantization levels. The bitrate ratio indicates the ratio in which the total EVS bitrate has to be distributed between input audio signal channels. The EVS min bitrate is a value below which total EVS bitrate is not allowed to go. The EVS bitrate deviation steps are the EVS target bitrate reduction steps when the EVS priority is higher than or equal to, or lower, than the priority of the spatial MD.

Calculate Best EVS Bitrate and Metadata Quantization Level Based on Input Parameters In Step 508, an optimal EVS bitrate and metadata quantization strategy is calculated based on the input parameters obtained in Steps 501-503, according to the following substeps. A high bitrate for the downmix channels and coarse quantization strategy may lead to spatial issues while a fine quantization strategy and low downmix audio channel bitrate may lead to mono codec coding artifacts. "Optimal" as used herein is the most balanced distribution of IVAS bitrate between the EVS bitrate and metadata quantization level while utilizing all the available bits in the IVAS bitrate budget, or at least significantly reducing bit wastage.

Step 508.1: Quantize the metadata with the finest quantization level and check Condition 508.*a* (shown below). If Condition 508.*a* is TRUE, then do Step 508.*b* (shown below). Otherwise, continue to either Step 508.2 or 508.3 or 508.4 based on the priorities calculated in Step 503.

Step 508.2: If the EVS priority is high and the spatial MD priority is low, then reduce the quantization level of the spatial MD and check condition 508.*a*. If Condition 508.*a* is TRUE, then do Step 508.*b*. Otherwise, reduce the EVS target bitrate based on Step 507 (EVS bitrate deviation steps) and check Condition 508*a*. If Condition 508*a* is TRUE then do Step 508.*b*, else repeat Step 508.2.

Step 508.3: If the EVS priority is low and the spatial MD priority is high, then reduce the EVS target bitrate based on Step 507 (EVS bitrate deviation steps) and check Condition 508.*a*. If Condition 508.*a* is TRUE, then do Step 508.*b*. Otherwise, reduce the quantization level of the spatial MD and check Condition 508.*a*. If Condition 508.*a* is TRUE then do Step 508.*b*. Otherwise, repeat Step 508.3.

Step 508.4: If the EVS priority is equal to the spatial MD priority, then reduce the EVS target bitrate based on Step 507 (EVS bitrate deviation steps) and check Condition 508.*a*. If Condition 508.*a* is TRUE, then do Step 508.*b*. Otherwise, reduce the quantization level of the spatial metadata and check Condition 508.*a*. If Condition 508.*a* is TRUE then do Step 508.*b*, else repeat step 5.4.

The Condition 508.*a* referenced above checks whether the sum of metadata bitrate, EVS target bitrate and overhead bits is less than or equal to the IVAS bitrate.

The Step 508.*b* referenced above computes the EVS bitrate to be equal to the IVAS bitrate minus the metadata bitrate minus overhead bits. The EVS bitrate is then distributed among the downmix audio channels as per the bitrate ratio mentioned in Step 507.

If the minimum EVS target bitrate and the coarsest quantization level do not fit within the IVAS bitrate budget, then the bitrate distribution process 500 is performed with a lower bandwidth.

In an embodiment, the table index and metadata quantization level information are included in overhead bits of an IVAS bitstream sent to an IVAS decoder. The IVAS decoder reads the table index and metadata quantization level from the overhead bits in the IVAS bitstream and decodes the spatial MD. This leaves the IVAS decoder with only EVS bits in the IVAS bitstream to process. The EVS bits are divided among input audio signal channels as per the ratio indicated by the table index (step 508.*b*). Then each EVS decoder instance is called with the corresponding bits which leads to a reconstruction of the downmix audio channels.

Example IVAS Bitrate Distribution Control Table

Below is an example IVAS Bitrate Distribution Control Table. The following parameters shown in the table have the values indicated below:

Input format: Stereo—1, Planar FoA—2, FoA—3

BW: NB—0, WB—1, SWB—2, FB—3

Allowed spatial coding tool: FP—1, MR—2

Transition mode: 1→MR to FP transition, 0→otherwise

Mono downmix backward compatible mode: 1→if Mid channel should be compatible with 3GPP EVS, 0→otherwise.

TABLE I

Example IVAS Bitrate Distribution Table

| IVAS BR (kbps) | Input Format | BW | Spatial Audio Coding Mode | Transition Mode | Mono Downmix Backward Compatible Mode | EVS Target BR (bps) | BR Ratio | EVS Min BR (bps) | EVS BR Deviation Steps (bps) |
|---|---|---|---|---|---|---|---|---|---|
| 16.4 | 1 | 1 | 1 | 0 | 0 | 11400 | (1, 0) | 9000 | (200, 400, 800) |
| 16.4 | 1 | 2 | 1 | 0 | 0 | 11400 | (1, 0) | 9000 | (200, 400, 800) |
| 16.4 | 1 | 2 | 1 | 0 | 1 | 9600 | (1, 0) | 9600 | (0, 0, 0) |
| 24.4 | 1 | 1 | 1 | 0 | 0 | 19200 | (1, 0) | 16400 | (200, 400, 800) |
| 24.4 | 1 | 1 | 2 | 0 | 0 | 19200 | (3, 2) | 16400 | (50, 100, 200) |
| 24.4 | 1 | 1 | 1 | 1 | 0 | 19200 | (3, 2) | 16400 | (50, 100, 200) |
| 24.4 | 2 | 1 | 1 | 0 | 0 | 16400 | (1, 0, 0) | 13200 | (200, 400, 800) |
| 24.4 | 1 | 2 | 1 | 0 | 0 | 19200 | (1, 0) | 16400 | (200, 400, 800) |
| 24.4 | 1 | 2 | 2 | 0 | 0 | 19200 | (3, 2) | 16400 | (50, 100, 200) |
| 24.4 | 1 | 2 | 1 | 1 | 0 | 19200 | (3, 2) | 16400 | (50, 100, 200) |
| 24.4 | 1 | 2 | 2 | 0 | 1 | 19200 | (1, 1) | 19200 | (0, 0, 0) |
| 24.4 | 2 | 2 | 1 | 0 | 0 | 16400 | (1, 0, 0) | 13200 | (200, 400, 800) |
| 24.4 | 2 | 2 | 1 | 0 | 1 | 13200 | (1, 0, 0) | 13200 | (0, 0, 0) |
| 24.4 | 1 | 3 | 1 | 0 | 0 | 19200 | (1, 0) | 16400 | (200, 400, 800) |
| 32 | 1 | 1 | 2 | 0 | 0 | 28000 | (3, 2) | 24400 | (50, 100, 200) |
| 32 | 2 | 1 | 1 | 0 | 0 | 23200 | (1, 0, 0) | 19200 | (400, 800, 1200) |
| 32 | 3 | 1 | 1 | 0 | 0 | 20800 | (1, 0, 0, 0) | 16400 | (400, 800, 1200) |
| 32 | 1 | 2 | 1 | 0 | 0 | 28000 | (1, 0) | 24400 | (400, 800, 1200) |
| 32 | 1 | 2 | 2 | 0 | 0 | 28000 | (3, 2) | 24400 | (50, 100, 200) |
| 32 | 1 | 2 | 2 | 0 | 1 | 26000 | (41, 24) | 26000 | (0, 0, 0) |
| 32 | 1 | 2 | 1 | 1 | 0 | 28000 | (3, 2) | 24400 | (50, 100, 200) |
| 32 | 2 | 2 | 1 | 0 | 0 | 26600 | (1, 0, 0) | 25200 | (400, 800, 1200) |
| 32 | 2 | 2 | 2 | 0 | 0 | 26600 | (3, 2, 2) | 25200 | (50, 100, 200) |
| 32 | 2 | 2 | 1 | 0 | 1 | 16400 | (1, 0, 0) | 16400 | (0, 0, 0) |
| 32 | 2 | 2 | 1 | 1 | 0 | 26600 | (3, 2, 2) | 25200 | (50, 100, 200) |
| 32 | 3 | 2 | 1 | 0 | 0 | 20800 | (1, 0, 0, 0) | 16400 | (400, 800, 1200) |
| 32 | 1 | 3 | 1 | 0 | 0 | 26000 | (1, 0) | 23200 | (400, 800, 1200) |
| 32 | 2 | 3 | 1 | 0 | 0 | 26400 | (1, 0, 0) | 23200 | (400, 800, 1200) |
| 48 | 1 | 1 | 2 | 0 | 0 | 44000 | (3, 2) | 40000 | (100, 200, 400) |
| 48 | 2 | 1 | 2 | 0 | 0 | 40000 | (3, 2, 2) | 36000 | (100, 200, 400) |
| 48 | 3 | 1 | 2 | 0 | 0 | 39600 | (3, 2, 2, 2) | 34200 | (100, 200, 300) |
| 48 | 1 | 2 | 2 | 0 | 0 | 44000 | (3, 2) | 40000 | (100, 200, 400) |
| 48 | 1 | 2 | 2 | 0 | 1 | 40800 | (61, 41) | 40800 | (0, 0, 0) |
| 48 | 2 | 2 | 2 | 0 | 0 | 40000 | (3, 2, 2) | 36000 | (100, 200, 400) |
| 48 | 2 | 2 | 2 | 0 | 1 | 35600 | (41, 24, 24) | 35600 | (0, 0, 0) |
| 48 | 3 | 2 | 1 | 0 | 0 | 34000 | (1, 0, 0, 0) | 30000 | (600, 1000, 1600) |
| 48 | 3 | 2 | 1 | 0 | 1 | 24400 | (1, 0, 0, 0) | 24400 | (0, 0, 0) |
| 48 | 1 | 3 | 1 | 0 | 0 | 44000 | (1, 0) | 40000 | (600, 1000, 1600) |

TABLE I-continued

Example IVAS Bitrate Distribution Table

| IVAS BR (kbps) | Input Format | BW | Spatial Audio Coding Mode | Transition Mode | Mono Downmix Backward Compatible Mode | EVS Target BR (bps) | BR Ratio | EVS Min BR (bps) | EVS BR Deviation Steps (bps) |
|---|---|---|---|---|---|---|---|---|---|
| 48 | 1 | 3 | 2 | 0 | 0 | 44000 | (3, 2) | 40000 | (100, 200, 400) |
| 48 | 1 | 3 | 1 | 1 | 0 | 44000 | (3, 2) | 40000 | (100, 200, 400) |
| 48 | 2 | 3 | 1 | 0 | 0 | 39200 | (1, 0, 0) | 35200 | (600, 1000, 1600) |
| 48 | 3 | 3 | 1 | 0 | 0 | 34000 | (1, 0, 0, 0) | 30000 | (600, 1000, 1600) |
| 64 | 1 | 1 | 2 | 0 | 0 | 60000 | (3, 2) | 56000 | (100, 200, 400) |
| 64 | 2 | 1 | 2 | 0 | 0 | 57400 | (3, 2, 2) | 52500 | (100, 200, 400) |
| 64 | 3 | 1 | 2 | 0 | 0 | 52000 | (3, 2, 2, 2) | 45000 | (100, 200, 300) |
| 64 | 1 | 2 | 2 | 0 | 0 | 60000 | (3, 2) | 56000 | (100, 200, 400) |
| 64 | 1 | 2 | 2 | 0 | 1 | 48800 | (1, 1) | 48800 | (0, 0, 0) |
| 64 | 2 | 2 | 2 | 0 | 0 | 57400 | (3, 2, 2) | 52200 | (100, 200, 400) |
| 64 | 2 | 2 | 2 | 0 | 1 | 50800 | (61, 33, 33) | 50800 | (0, 0, 0) |
| 64 | 3 | 2 | 2 | 0 | 0 | 52000 | (3, 2, 2, 2) | 45000 | (100, 200, 300) |
| 64 | 3 | 2 | 2 | 0 | 1 | 45200 | (41, 24, 24, 24) | 45200 | (0, 0, 0) |
| 64 | 1 | 3 | 2 | 0 | 0 | 60000 | (3, 2) | 56000 | (100, 200, 400) |
| 64 | 2 | 3 | 1 | 0 | 0 | 57400 | (1, 0, 0) | 52500 | (800, 1200, 2000) |
| 64 | 2 | 3 | 2 | 0 | 0 | 57400 | (3, 2, 2) | 52500 | (100, 200, 400) |
| 64 | 2 | 3 | 1 | 1 | 0 | 57400 | (3, 2, 2) | 52500 | (100, 200, 400) |
| 64 | 3 | 3 | 1 | 0 | 0 | 48000 | (1, 0, 0, 0) | 40000 | (800, 1200, 2000) |
| 96 | 1 | 1 | 2 | 0 | 0 | 90000 | (3, 2) | 86000 | (200, 400, 600) |
| 96 | 2 | 1 | 2 | 0 | 0 | 86000 | (3, 2, 2) | 78000 | (200, 300, 400) |
| 96 | 3 | 1 | 2 | 0 | 0 | 84000 | (3, 2, 2, 2) | 76000 | (100, 200, 300) |
| 96 | 1 | 2 | 2 | 0 | 0 | 90000 | (3, 2) | 86000 | (200, 400, 600) |
| 96 | 1 | 2 | 2 | 0 | 1 | 88000 | (6, 5) | 88000 | (0, 0, 0) |
| 96 | 2 | 2 | 2 | 0 | 0 | 86000 | (3, 2, 2) | 78000 | (200, 300, 400) |
| 96 | 2 | 2 | 2 | 0 | 1 | 80800 | (80, 61, 61) | 80800 | (0, 0, 0) |
| 96 | 3 | 2 | 2 | 0 | 0 | 84000 | (3, 2, 2, 2) | 76000 | (100, 200, 300) |
| 96 | 3 | 2 | 2 | 0 | 1 | 81200 | (80, 41, 41, 41) | 81200 | (0, 0, 0) |
| 96 | 1 | 3 | 2 | 0 | 0 | 90000 | (3, 2) | 86000 | (200, 400, 600) |
| 96 | 2 | 3 | 2 | 0 | 0 | 86000 | (3, 2, 2) | 78000 | (200, 300, 400) |
| 96 | 3 | 3 | 1 | 0 | 0 | 84000 | (1, 0, 0, 0) | 76000 | (1000, 2000, 3000) |
| 96 | 3 | 3 | 2 | 0 | 0 | 84000 | (3, 2, 2, 2) | 76000 | (100, 200, 300) |
| 96 | 3 | 3 | 1 | 1 | 0 | 84000 | (3, 2, 2, 2) | 76000 | (100, 200, 300) |
| 128 | 1 | 1 | 2 | 0 | 0 | 122000 | (3, 2) | 118000 | (200, 400, 600) |
| 128 | 2 | 1 | 2 | 0 | 0 | 118000 | (3, 2, 2) | 110000 | (200, 300, 400) |
| 128 | 3 | 1 | 2 | 0 | 0 | 116000 | (3, 2, 2, 2) | 108000 | (100, 200, 300) |
| 128 | 1 | 2 | 2 | 0 | 0 | 122000 | (3, 2) | 118000 | (200, 400, 600) |
| 128 | 2 | 2 | 2 | 0 | 0 | 118000 | (3, 2, 2) | 110000 | (200, 300, 400) |
| 128 | 3 | 2 | 2 | 0 | 0 | 116000 | (3, 2, 2, 2) | 108000 | (100, 200, 300) |
| 128 | 1 | 3 | 2 | 0 | 0 | 122000 | (3, 2) | 118000 | (200, 400, 600) |
| 128 | 2 | 3 | 2 | 0 | 0 | 118000 | (3, 2, 2) | 110000 | (200, 300, 400) |
| 128 | 3 | 3 | 2 | 0 | 0 | 116000 | (3, 2, 2, 2) | 108000 | (100, 200, 300) |
| 256 | 1 | 1 | 2 | 0 | 0 | 248000 | (3, 2) | 244000 | (400, 800, 1000) |
| 256 | 2 | 1 | 2 | 0 | 0 | 244000 | (3, 2, 2) | 236000 | (300, 500, 800) |
| 256 | 3 | 1 | 2 | 0 | 0 | 240000 | (3, 2, 2, 2) | 232000 | (300, 400, 600) |
| 256 | 1 | 2 | 2 | 0 | 0 | 248000 | (3, 2) | 244000 | (400, 800, 1000) |
| 256 | 2 | 2 | 2 | 0 | 0 | 244000 | (3, 2, 2) | 236000 | (300, 500, 800) |
| 256 | 3 | 2 | 2 | 0 | 0 | 240000 | (3, 2, 2, 2) | 232000 | (300, 400, 600) |
| 256 | 1 | 3 | 2 | 0 | 0 | 248000 | (3, 2) | 244000 | (400, 800, 1000) |
| 256 | 2 | 3 | 2 | 0 | 0 | 244000 | (3, 2, 2) | 236000 | (300, 500, 800) |
| 256 | 3 | 3 | 2 | 0 | 0 | 240000 | (3, 2, 2, 2) | 232000 | (300, 400, 600) |

Also shown in FIG. 5A is the IVAS bitstream. In an embodiment, the IVAS bitstream includes a fixed length common IVAS header (CH) 509 and a variable length common tool header (CTH) 510. In an embodiment, the bit length of the CTH section is calculated based on the number of entries corresponding to the given IVAS bitrate in the IVAS bitrate distribution control table. The relative table index (offset from the first index for that IVAS bitrate in the table) is stored in the CTH section. If operating in the mono downmix backward compatible mode, the CTH 510 is followed by the EVS payload 511, which is followed by the spatial MD payload 513. If operating in IVAS mode, CTH 510 is followed by the spatial MD payload 512, which is followed by the EVS payload 514. In other embodiments, the order may be different.

Example Processes

An example process of bitrate distribution can be performed by an IVAS codec or encoding/decoding system including one or more processors executing instructions stored on a non-transitory computer-readable storage medium.

In an embodiment, a system encoding audio receives an audio input and metadata. The system determines, based on the audio input, metadata, and parameters of an IVAS codec used in encoding the audio input, one or more indices of a bitrate distribution control table, the parameters including an IVAS bitrate, a input format, and a mono backward compatibility mode, the one or more indices including a spatial audio coding mode and a bandwidth of the audio input.

The system performs a lookup in the bitrate distribution control table based on the IVAS bitrate, the input format, the spatial audio coding mode and the one or more indices, the lookup identifying an entry in the bitrate distribution control table, the entry including an EVS target bitrate, a bitrate ratio, an EVS minimum bitrate, and a representation of EVS bitrate deviation steps.

The system provides the identified entry to a bitrate calculation process that is programmed to determine bitrates of audio inputs (e.g., downmix channels), a bitrate of metadata, and quantization levels of the metadata. The system provides the bitrates of the downmix channels and at least one of the bitrate of metadata or the quantization levels of the metadata to a downstream IVAS device.

In some implementations, the system can extract properties from the audio input, the properties including an indicator of whether the audio input is speech or music and a bandwidth of the audio input. The system determines, based on the properties, a priority between the bitrate of downmix channels and the bitrate of metadata. The system provides the priority to the bitrate calculation process.

In some implementations, the system extracts one or more parameters including a residual (side channel prediction error) level from spatial MD. The system determines, based on the parameters, the spatial audio coding mode which indicates the need for one or more residual channels in the IVAS bitstream. The system provides the spatial audio coding mode to the bitrate calculation process.

In some implementations, the bitrate distribution control table index is stored in a Common Tool header (CTH) of an IVAS bitstream.

A system for decoding audio is configured to receive an IVAS bitstream. The system determines, based on the IVAS bitstream, the IVAS bitrate and bitrate distribution control table indices. The system performs a lookup in the bitrate distribution control table based on the table indices and extracts the input format, the spatial coding mode, the mono backward compatibility mode and the one or more indices, an EVS target bitrate and a bitrate ratio. The system extracts and decodes the downmix audio bits per downmix channel and spatial MD bits. The system provides the extracted downmix signal bits and spatial MD bits to a downstream IVAS device. The downstream IVAS device can be an audio processing device or a storage device.

SPAR FoA Bitrate Distribution Process

In an embodiment, the bitrate distribution process described above for stereo input signals can also be modified and applied to SPAR FoA bitrate distribution using the SPAR FoA bitrate distribution control Table shown below. Definitions for terms included in the table are provided below to assist the reader, followed by a SPAR FoA Bitrate Distribution Control Table Metadata target bits (MDtar)=IVAS_bits−header_bits−evs_target_bits (EVS tar)

Metadata max bits (MDmax)=IVAS_bits−header_bits−evs_minimum_bits (EVSmin)

Metadata target bits should always be less than "MDmax".

TABLE II

Example SPAR FoA Bitrate Distribution Control Table

| IVAS BR (kbps) | BW | N_dmx | Remix string | Active W | Complex flag | dmx switch transition mode (placeholder) | EVS ( target, min, max ) BR (kbps) | MD quant levels Target Fallback 1 Fallback 2 (Notation: [PR, C, P_d, P_o]) | TD Decor relator ducking | MD (target, max) BR (kbps) | Fallback2 worst case MD BR (kbps) with base 2 coding; coding for real coefficients, inc 1. 0.4kbps header |
|---|---|---|---|---|---|---|---|---|---|---|---|
| 32 | 3 | 1 | WYXZ | 1 | 0 | 0 | W': (24, 20.45, 31.95) | T: [21, 1, 5, 1] F1: [15, 1, 5, 1] F2: [15, 1, 3, 1] | 0 | (8, 11.55) | 11.2 |
| 64 | 3 | 2 | WYXZ | 0 | 0 | 0 | W:(38, 34.05, 56) Y': (16, 15.60, 20.40) | T: [21, 7, 5, 1] F1: [15, 7, 5, 1] F2: [15, 7, 3, 1] | 1 | (10, 14.35) | 13.6 |
| 96 | 3 | 3 | WYXZ | 0 | 0 | 0 | W: (47, 42.60, 56) Y': (23, 22.6, 31.95; X': (16, 15.60, 20.4) | T: [21, 9, 9, 1] F1: [21, 7, 5, 1] F2: [21, 7, 5, 1] | 1 | (10, 15.2) | 14.8 |
| 160 | 3 | 3 | WYXZ | 0 | 0 | 0 | W: (74, 70.9, 112) Y': (41, 40.05, 56) X': (35, 34.05, 56) | T: [21, 11, 11, 1] F1: [21, 9, 9, 1] F2: [21, 7, 7, 1] | 1 | (10, 15) | 14.8 |
| 256 | 3 | 4 | WYXZ | 0 | 0 | 0 | W: (90, 90, 112) Y': (70, 70, 112) X': (50, 50, 56) Z': (36.6, 36.6, 56) | T: [31, 1, 1, 1] F1: [31, 1, 1, 1] F2: [31, 1, 1, 1] | 1 | (9.0, 9.4) | 9.4 |

Some example computations of maximum MD bitrates (real coefficients) are shown in the table below.

| | Number of Spatial Parameters | | | | Quantization Levels → | Calculation: | Max BR |
|---|---|---|---|---|---|---|---|
| N_dmx | PR | C | P_d | P_o | Bits | #params * bits' * 50 | (bps) |
| 1 | 36 | 0 | 36 | 36 | [15, 1, 3, 1] → (4, 0, 2, 0) | (4*36 + 0 + 2*36 + 0)*50 | 10800 |
| 2 | 36 | 24 | 24 | 12 | [15, 7, 3, 1] → (4, 3, 2, 0) | (4*36 + 3*24 + 2*24 + 0)*50 | 13200 |
| 3 | 36 | 24 | 12 | 0 | [21, 7, 7, 1] → (5, 3, 3, 0) | (5*36 + 3*24 + 3*12 + 0)*50 | 14400 |
| 4 | 36 | 0 | 0 | 0 | [31, 1, 1, 1] → (5, 0, 0, 0) | 5*36*50 | 9000 |

Example Metadata Quantization Loop

In an embodiment, a metadata quantization loop is implemented as described below. The metadata quantization loop includes two thresholds (defined above): MDtar and MDmax.

Step 1: For every frame of the input audio signal, the MD parameters are quantized in a non-time differential manner and coded with an arithmetic coder. Actual metadata bitrate (MDact) is computed based on the MD coded bits. If MDact is below MDtar, then this step is considered as a pass and the process exits the quantization loop and MDact bits are integrated into the IVAS bitstream. Any extra available bits (MDtar-MDact) are supplied to the mono codec (EVS) encoder to increase the bit rate of the essence of the downmix audio channels. More bit rate allows more information to be encoded by the mono codec and the decoded audio output will be comparatively less lossy.

Step 2: If Step 1 fails, then a subset of MD parameter values in the frame is quantized and then subtracted from the quantized MD parameter values in the previous frame and the differential quantized parameter value is coded with the arithmetic coder (i.e., time differential coding). MDact is computed based on MD coded bits. If MDact is below MDtar, then this step is considered as a pass and the process exits the quantization loop and the MDact bits are integrated into the IVAS bitstream. Any extra available bits (MDtar−MDact) are supplied to the mono codec (EVS) encoder to increase the bit rate of the essence of the downmix audio channels.

Step 3: If Step 2 fails, then the bit rate (MDact) of quantized MD parameters are calculated with no entropy.

Step 4: The MDact bitrate values computed in Steps 1-3 are compared against MDmax. If the minimum of MDact bitrates computed in Step 1, Step 2, and Step 3 is within the MDmax, then this step is considered as a pass and the process exits the quantization loop and the MD bitstream with minimum MDact is integrated into the IVAS bitstream. If MDact is above MDtar, then bits (MDact-MDtar) are taken from the mono codec (EVS) encoder.

Step 5: If Step 4 fails, the parameters are quantized more coarsely and the steps above are repeated as a first fallback strategy (Fallback 1).

Step 6: If Step 5 fails, the parameters are quantized with a quantization scheme that is guaranteed to fit within the MDmax as a second fallback strategy (Fallback 2).

After all the iterations mentioned above it is guaranteed that metadata bitrate will fit within MDmax and the encoder will generate actual metadata bits or MDact.

Downmix Channels/EVS Bitrate Distribution (EVSbd)

In an embodiment, EVS actual bits (EVS act)= IVAS_bits−header_bits−MDact. If "EVSact" is less than "EVStar" then bits are taken from the EVS channels in the following order (Z, X, Y, W). The maximum bits that can be taken from any channel is EVStar(ch) minus EVSmin(ch). If "EVSact" is greater than "EVStar" then all the additional bits are assigned to the downmix channels in the following order: W, Y, X and Z. The maximum additional bits that can be added to any channel is EVSmax(ch)−EVStar(ch).

SPAR Decoder Unpacking

In an embodiment, a SPAR decoder unpacks an IVAS bitstream as follows:

1. Get the IVAS bitrate from the bit length and get the table index from the tool header (CTH) in the IVAS bitstream
2. Parse the header/metadata bits in the IVAS bitstream
3. Parse and unquantize the metadata bits.
4. Set "EVSact"=remaining bit length
5. Read the table entries related to EVS target, min and max bitrates and repeat the "EVSbd" step at the decoder to get the actual EVS bitrate for each channel
6. Decode the EVS channels and upmix to FoA channels

BR Distribution Process for SPAR FoA Input Audio Signals

Figure 5B:
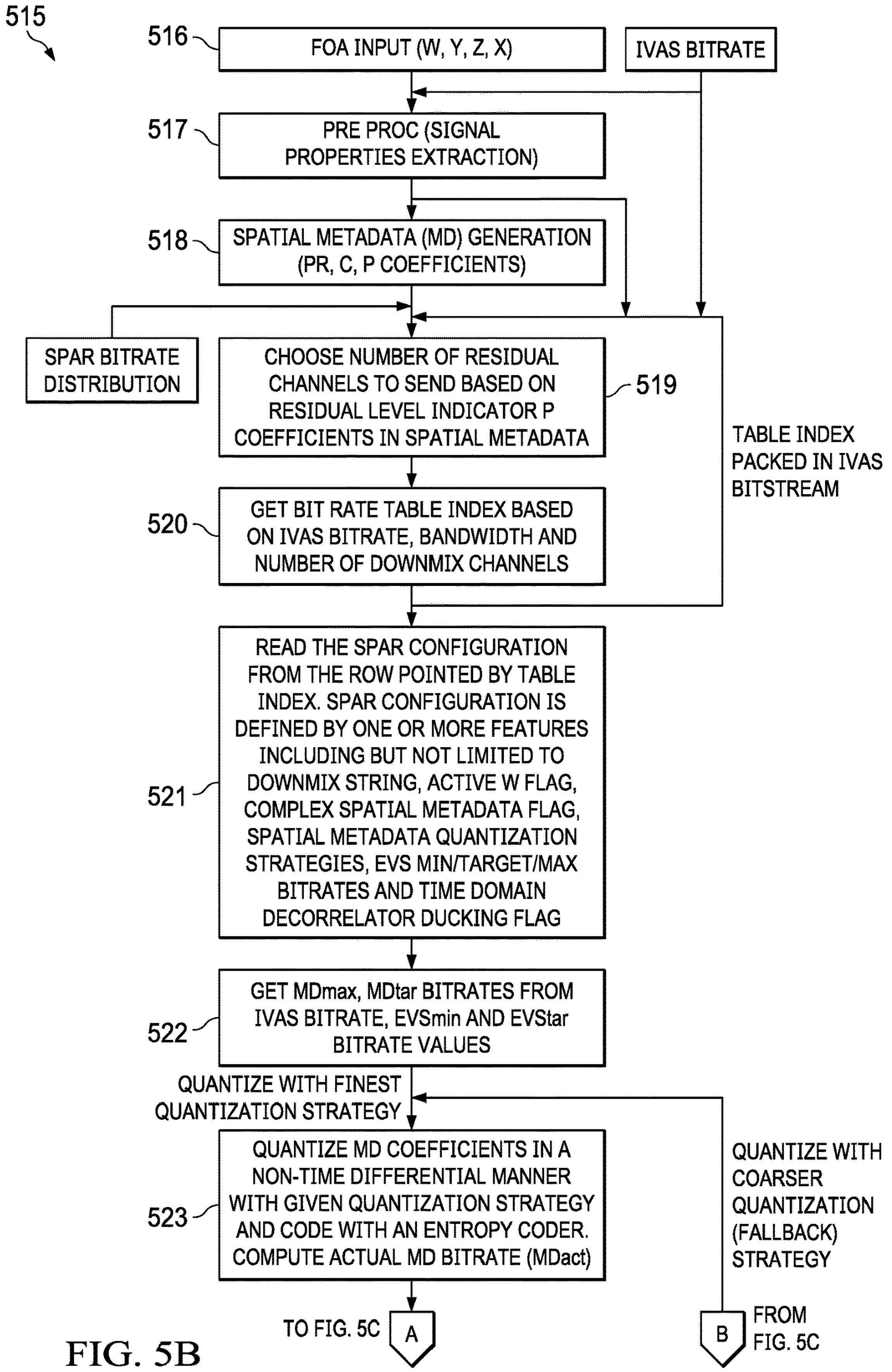
FIGS. 5B and 5C is a flow diagram of a bitrate distribution process for spatial reconstructor (SPAR) FoA input signals, according to an embodiment.
Figure 5C:
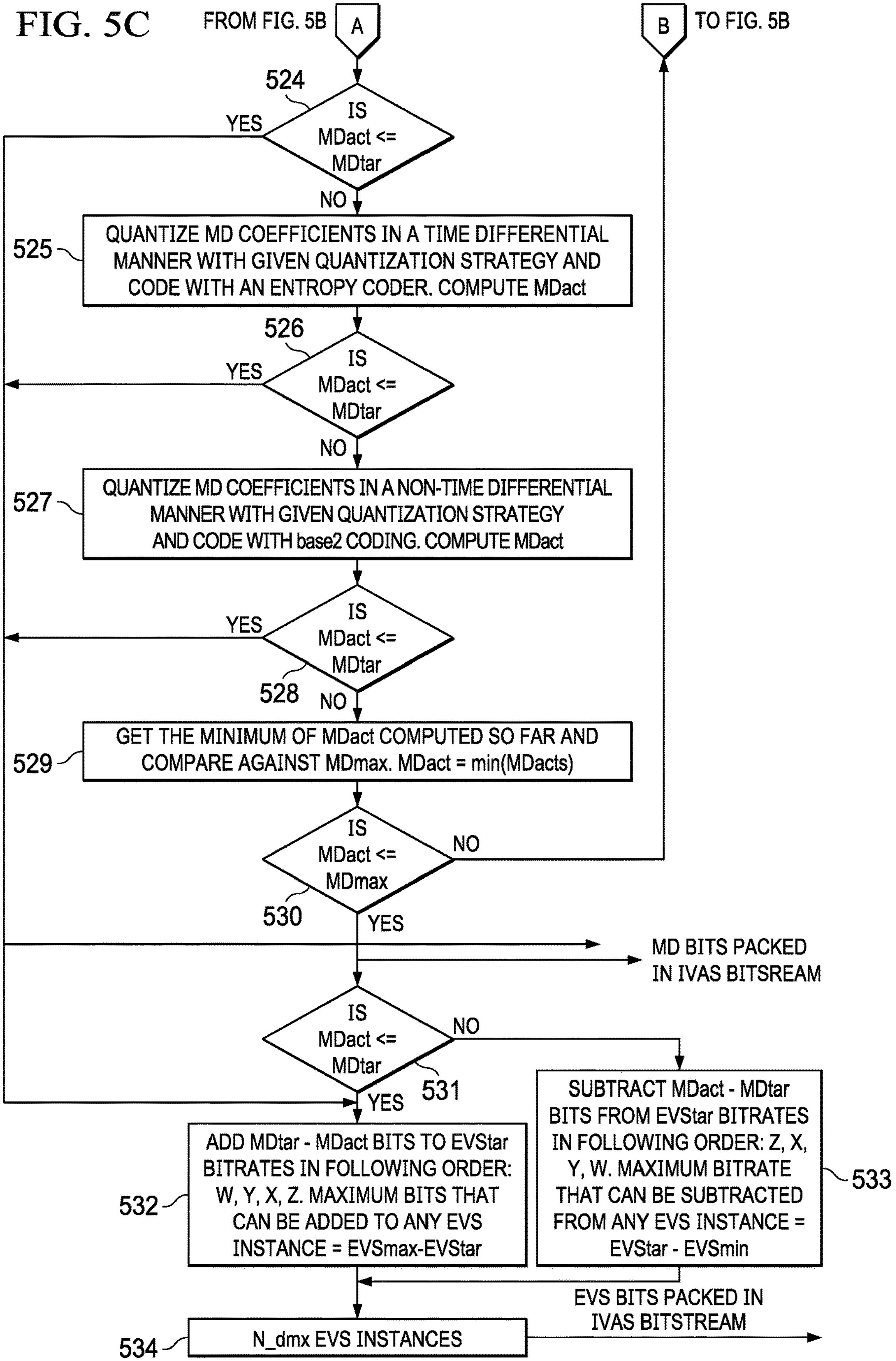

FIGS. 5B and 5C is a flow diagram of a bitrate distribution process 515 for SPAR FoA input signals, according to an embodiment. Process 515 begins by pre-processing 517 FoA input (W, Y, Z, X) 516 to extract signal properties using the IVAS bitrate, such as BW, speech/music classification data, VAD data, etc. Process 515 continues by generating spatial MD (e.g., PR, C, P coefficients) 518 and choosing a number of residual channels to send to the IVAS decoder based on a residual level indicator in the spatial MD (520) and obtaining a BR distribution control table index based on the IVAS bitrate, BW and the number of downmix channels (N_dmx) (521). In some embodiments, the P coefficients in the spatial MD can serve as the residual level indicator. The BR distribution control table index is sent to an IVAS bit packer (see FIGS. 4A, 4B) to be included in the IVAS bitstream that can be stored and/or sent to an IVAS decoder.

Process 515 continues by reading a SPAR configuration from a row in the BR distribution control table that is pointed to by the table index (521). As shown in Table II above, the SPAR configuration is defined by one or more features, including but not limited to: a downmix string (remix), active W flag, complex spatial MD flag, spatial MD quantization strategies, EVS min/target/max bitrates and time domain decorrelator ducking flag.

Process 515 continues by determining MDmax, MDtar bitrates from the IVAS bitrate, EVSmin and EVStar bitrate values (522), as previously described above, and entering a quantization loop that includes quantizing the spatial MD in a non-time differential manner using a quantization strategy, coding the quantized spatial MD with an entropy coder (e.g., arithmetic coder) and computing MDact (523). In an embodiment, the first iteration of the quantization loop uses a fine quantization strategy.

Process 515 continues by checking if MDact is less than or equal to MDtar (524). If MDact is less than or equal to MDtar, then the MD bits are sent to the IVAS bit packer to be included in the IVAS bitstream and (MDtar-MDact) bits are added to the EVStar bitrates (532) in the following order: W, Y, X, Z, N_dmx EVS bitstreams (channels) are generated and the EVS bits are sent to the IVAS bit packer to be included in the IVAS bitstream, as previously described. If MDact is not less than or equal to MDtar, then process 515 quantizes the spatial MD in a time differential manner with the fine quantization strategy, codes the quantized spatial MD with the entropy coder and computes MDact again (525). If MDact is less than or equal to MDtar, then the MD bits are sent to the IVAS bit packer to be included in the IVAS bitstream and (MDtar-MDact) bits are added to the EVStar bitrates (532) in the following order: W, Y, X, Z, N_dmx EVS bitstreams (channels) are generated and the EVS bits are sent to the IVAS bit packer to be included in the IVAS bitstream, as previously described. If MDact is greater than MDtar, the spatial MD is quantized in a non-time differential manner using the fine quantization strategy and entropy and base2 coded, and a new value for MDact is computed (527). Note that the maximum bits that can be added to any EVS instance equals EVSmax−EVStar.

Process 515 again determines if MDact is less than or equal to MDtar (528). If MDact is less than or equal to MDtar, then the MD bits are sent to the IVAS bit packer to be included in the IVAS bitstream and (MDtar−MDact) bits are added to the EVStar bitrates (532) in the following order: W, Y, X, Z, N_dmx EVS bitstreams (channels) are generated and the EVS bits are sent to the IVAS bit packer to be included in the IVAS bitstream, as previously described. If MDact is greater than to MDtar, then process 515 sets MDact as the minimum of the three MDact bitrates computed in (523), (525), (527) and compares MDact against MDmax (529). If MDact greater than MDmax (530), the quantization loop (steps 523-530) is repeated using a coarse quantization strategy, as previously described above.

If MDact is less than or equal to MDmax, then the MD bits are sent to the IVAS bit packer to be included in the IVAS bitstream, and process 515 again determines if MDact is less than or equal to MDtar (531). If MDact is less than or equal to MDtar, then (MDtar-MDact) bits are added to the EVStar bitrates (532) in the following order: W, Y, X, Z, N_dmx EVS bitstreams (channels) are generated and the EVS bits are sent to the IVAS bit packer to be included in the IVAS bitstream, as previously described. If MDact is greater than MDtar, then (MDtar−MDact) bits are subtracted from the EVStar bitrates (532) in the following order: Z, X, Y, W, N_dmx EVS bitstreams (channels) are generated and the EVS bits are sent to the IVAS bit packer to be included in the IVAS bitstream, as previously described. Note that the maximum bits that can be subtracted from any EVS instance equals EVStar-EVSmin.

Example Processes

Figure 6:
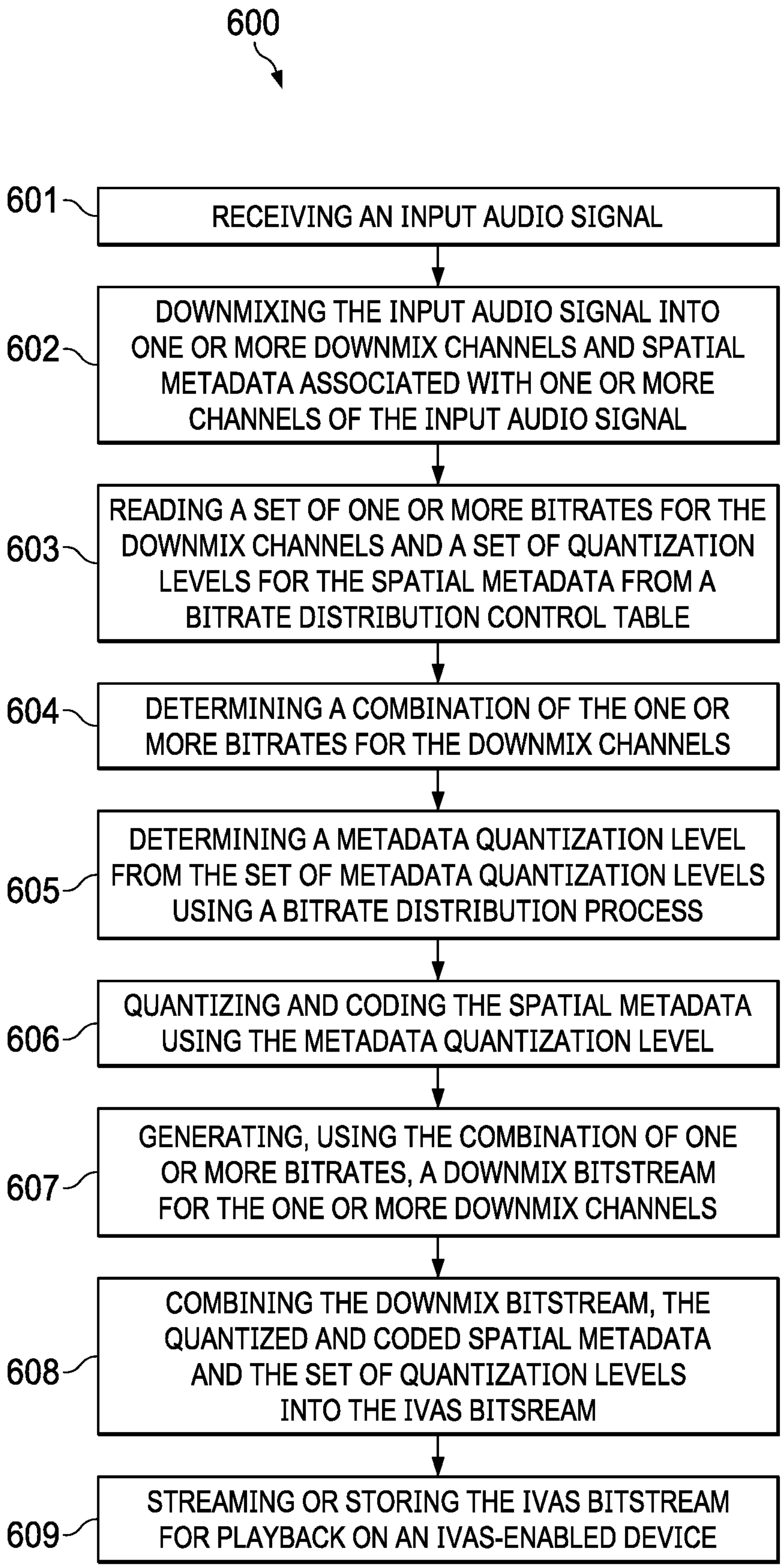
FIG. 6 is a flow diagram of a bitrate distribution process for a stereo, planar FoA and FoA input signals, according to an embodiment.

FIG. 6 is a flow diagram of a IVAS encoding process 600, according to an embodiment. Process 600 can be implemented using the device architecture as described in reference to FIG. 8.

Process 600 includes receiving an input audio signal (601), downmixing the input audio signal into one or more downmix channels and spatial metadata associated with one or more channels of the input audio signal (602); reading a set of one or more bitrates for the downmix channels and a set of quantization levels for the spatial metadata from a bitrate distribution control table (603); determining a combination of the one or more bitrates for the downmix channels (604); determining a metadata quantization level from the set of metadata quantization levels using a bitrate distribution process (605); quantizing and coding the spatial metadata using the metadata quantization level (606); generating, using the combination of one or more bitrates, a downmix bitstream for the one or more downmix channels (607); combining the downmix bitstream, the quantized and coded spatial metadata and the set of quantization levels into the IVAS bitstream (608); and streaming or storing the IVAS bitstream for playback on an IVAS-enabled device (609).

Figure 7:
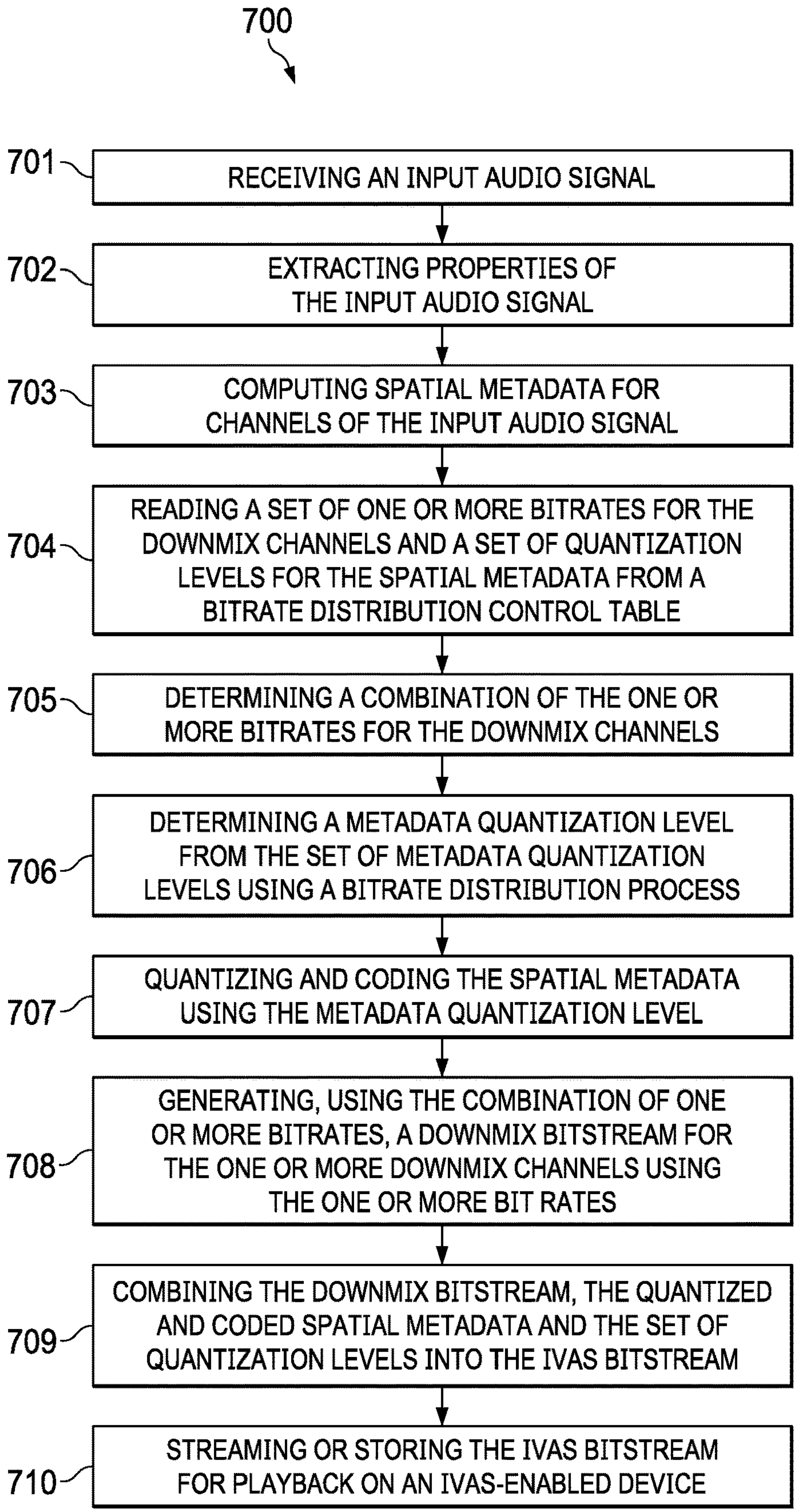
FIG. 7 is a flow diagram of a bitrate distribution process for a SPAR FoA input signal, according to an embodiment.

FIG. 7 is a flow diagram of an alternative IVAS encoding process 700, according to an embodiment. Process 700 can be implemented using the device architecture as described in reference to FIG. 8.

Process 700 includes receiving an input audio signal (701); extracting properties of the input audio signal (702); computing spatial metadata for channels of the input audio signal (703); reading a set of one or more bitrates for the downmix channels and a set of quantization levels for the spatial metadata from a bitrate distribution control table (704); determining a combination of the one or more bitrates for the downmix channels (705); determining a metadata quantization level from the set of metadata quantization levels using a bitrate distribution process (706); quantizing and coding the spatial metadata using the metadata quantization level (707); generating, using the combination of one or more bitrates, a downmix bitstream for the one or more downmix channels using the one or more bit rates (708); combining the downmix bitstream, the quantized and coded spatial metadata and the set of quantization levels into the IVAS bitstream (709); and streaming or storing the IVAS bitstream for playback on an IVAS-enabled device (710).

Example System Architecture

Figure 8:
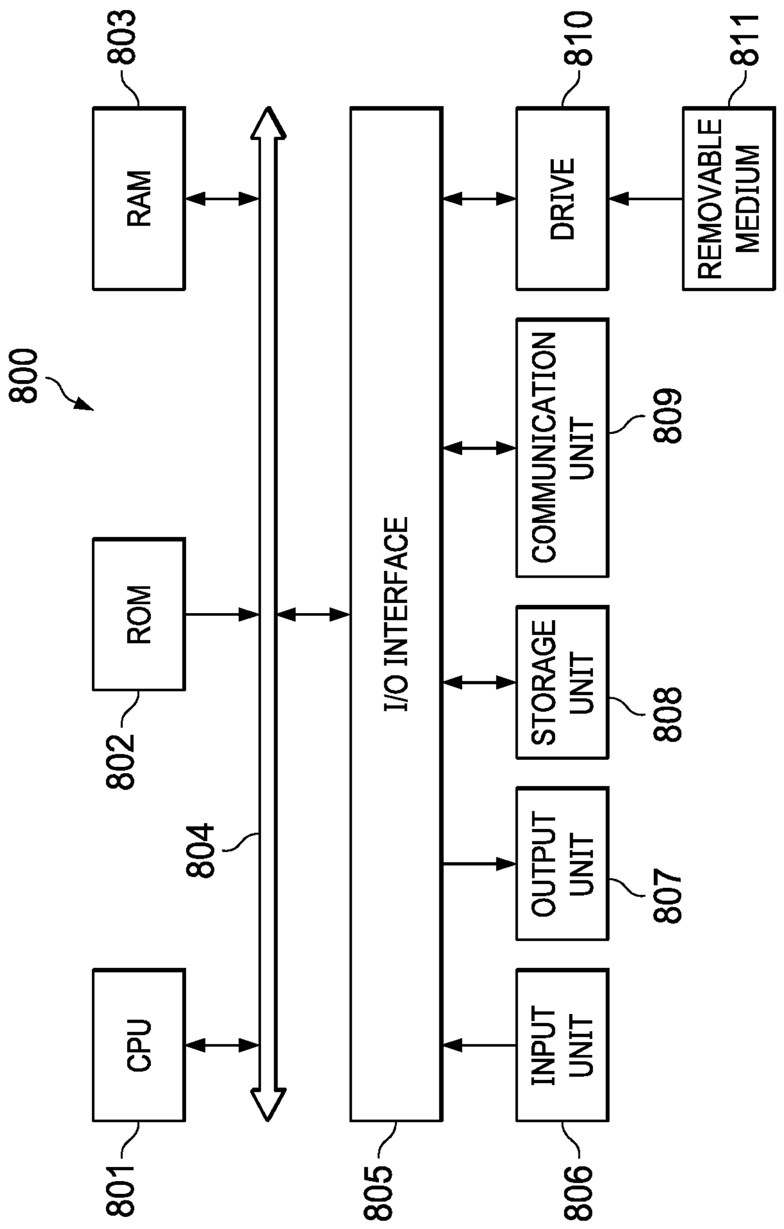
FIG. 8 is a block diagram of an example device architecture, according to an embodiment.

FIG. 8 shows a block diagram of an example system 800 suitable for implementing example embodiments of the present disclosure. System 800 includes one or more server computers or any client device, including but not limited to any of the devices shown in FIG. 1, such as the call server 102, legacy devices 106, user equipment 108, 114, conference room systems 116, 118, home theatre systems, VR gear 122 and immersive content ingest 124. System 800 include any consumer devices, including but not limited to: smart phones, tablet computers, wearable computers, vehicle computers, game consoles, surround systems, kiosks, As shown, the system 800 includes a central processing unit (CPU) 801 which is capable of performing various processes in accordance with a program stored in, for example, a read only memory (ROM) 802 or a program loaded from, for example, a storage unit 808 to a random access memory (RAM) 803. In the RAM 803, the data required when the CPU 801 performs the various processes is also stored, as required. The CPU 801, the ROM 802 and the RAM 803 are connected to one another via a bus 804. An input/output (I/O) interface 805 is also connected to the bus 804.

The following components are connected to the I/O interface 805: an input unit 806, that may include a keyboard, a mouse, or the like; an output unit 807 that may include a display such as a liquid crystal display (LCD) and one or more speakers; the storage unit 808 including a hard disk, or another suitable storage device; and a communication unit 809 including a network interface card such as a network card (e.g., wired or wireless).

In some implementations, the input unit 806 includes one or more microphones in different positions (depending on the host device) enabling capture of audio signals in various formats (e.g., mono, stereo, spatial, immersive, and other suitable formats).

In some implementations, the output unit 807 include systems with various number of speakers. As illustrated in FIG. 1, the output unit 807 (depending on the capabilities of the host device) can render audio signals in various formats (e.g., mono, stereo, immersive, binaural, and other suitable formats).

The communication unit 809 is configured to communicate with other devices (e.g., via a network). A drive 810 is also connected to the I/O interface 805, as required. A removable medium 811, such as a magnetic disk, an optical disk, a magneto-optical disk, a flash drive or another suitable removable medium is mounted on the drive 810, so that a computer program read therefrom is installed into the storage unit 808, as required. A person skilled in the art would understand that although the system 800 is described as including the above-described components, in real applications, it is possible to add, remove, and/or replace some of these components and all these modifications or alteration all fall within the scope of the present disclosure.

In accordance with example embodiments of the present disclosure, the processes described above may be implemented as computer software programs or on a computer-readable storage medium. For example, embodiments of the present disclosure include a computer program product including a computer program tangibly embodied on a machine readable medium, the computer program including program code for performing methods. In such embodiments, the computer program may be downloaded and mounted from the network via the communication unit 809, and/or installed from the removable medium 811, as shown in FIG. 8.

Generally, various example embodiments of the present disclosure may be implemented in hardware or special purpose circuits (e.g., control circuitry), software, logic or any combination thereof. For example, the units discussed above can be executed by control circuitry (e.g., a CPU in combination with other components of FIG. 8), thus, the control circuitry may be performing the actions described in this disclosure. Some aspects may be implemented in hardware, while other aspects may be implemented in firmware or software which may be executed by a controller, microprocessor or other computing device (e.g., control circuitry). While various aspects of the example embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, embodiments of the present disclosure include a computer program product including a computer program tangibly embodied on a machine readable medium, the computer program containing program codes configured to carry out the methods as described above.

In the context of the disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may be non-transitory and may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the present disclosure may be written in any combination of one or more programming languages. These computer program codes may be provided to a processor of a general purpose computer, special purpose computer, or other programmable data processing apparatus that has control circuitry, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server or distributed over one or more remote computers and/or servers.

While this document contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method of encoding an immersive voice and audio services (IVAS) bitstream, the method comprising:

receiving, using one or more processors, an input audio signal;

downmixing, using the one or more processors, the input audio signal into one or more downmix channels and spatial metadata associated with one or more channels of the input audio signal;

obtaining using the one or more processors, a set of one or more target bitrates for the one or more downmix channels and a set of metadata quantization levels for the spatial metadata from a bitrate distribution control table;

determining, using the one or more processors, a combination of the one or more target bitrates for the one or more downmix channels;

determining, using the one or more processors, a metadata quantization level from the set of metadata quantization levels using a bitrate distribution process, wherein the bitrate distribution process adjusts at least one of the target bitrates or at least one of the metadata quantization levels of the spatial metadata based at least in part on a bitrate budget for the IVAS bitstream;

quantizing and coding, using the one or more processors, the spatial metadata using the metadata quantization level;

generating, using the one or more processors and the combination of one or more target bitrates, a downmix bitstream for the one or more downmix channels;

combining, using the one or more processors, the downmix bitstream, the quantized and coded spatial metadata and the coded set of metadata quantization levels into the IVAS bitstream; and outputting, streaming or storing the IVAS bitstream for playback on an IVAS- enabled device.

2. The method of claim 1, wherein the input audio signal is a four-channel first order Ambisonic (FoA) audio signal, three-channel planar FoA signal or a two-channel stereo audio signal.

3. The method of claim 1, wherein the one or more target bitrates are bitrates of one or more instances of a mono audio coder/decoder (codec).

4. The method of claim 1, wherein the mono audio codec is an enhanced voice services (EVS) codec and the downmix bitstream is an EVS bitstream.

5. The method of claim 1, wherein obtaining, using the one or more processors, the set of one or more target bitrates for the one or more downmix channels and the set of metadata quantization levels for the spatial metadata using the bitrate distribution control table, further comprises:

identifying a row in the bitrate distribution control table using a table index that includes one or more of a format of the input audio signal, a bandwidth of the input audio signal, an allowed spatial coding tool, a transition mode and a mono downmix backward compatible mode; and extracting from the identified row of the bitrate distribution control table, one or more of a target bitrate, a bitrate ratio, a minimum bitrate and bitrate deviation steps, wherein the bitrate ratio indicates a ratio in which a total bitrate is to be distributed between the downmix audio signal channels, the minimum bitrate is a value below which the total bitrate is not allowed to go and the bitrate deviation steps are target bitrate reduction steps when a first priority for the downmix signals is higher than or equal to, or lower, than a second priority of the spatial metadata; and wherein determining the combination of the one or more bitrates for the one or more downmix channels and the spatial metadata is based on one or more of the target bitrate, the bitrate ratio, the minimum bitrate and the bitrate deviation steps.

6. The method of claim 1, wherein quantizing and coding the spatial metadata for the one or more channels of the input audio signal using a the set of metadata quantization levels is performed in a quantization loop that applies increasingly coarse quantization strategies based on a difference between a target metadata bit rate and an actual metadata bitrate.

7. The method of claim 1, wherein the quantization is determined in accordance with a mono codec priority and a spatial metadata priority based on properties extracted from the input audio signal and channel banded co-variance values.

8. The method of claim 1, wherein the input audio signal is a stereo signal and the downmix signals include a representation of a mid-signal, residuals from the stereo signal and the spatial metadata.

9. The method of claim 1, wherein the spatial metadata includes prediction coefficients (PR), cross-prediction coefficients (C) and decorrelation coefficients (P) for a spatial reconstructor (SPAR) format and prediction coefficients (PR) or decorrelation coefficients (PR) for complex advanced coupling (CACPL) format.

10. The method of claim 1, wherein obtaining, using the one or more processors, the set of one or more target bitrates for the one or more downmix channels using the bitrate distribution control table, further comprises:

identifying a row in the bitrate distribution control table using a table index that includes one or more of a format of the input audio signal, a bandwidth of the input audio signal and a IVAS bitrate; and extracting, from the identified row of the bitrate distribution control table, one or more of a target bitrate, a minimum bitrate, and a maximum bitrate for each of the one or more downmix channels, wherein the minimum bitrate and maximum bitrate define a bitrate range for the bitrate of the downmix channel, and wherein the target bitrate is a preferred bitrate for the downmix channel; and computing, a total downmix bitrate by subtracting the metadata bitrate and IVAS header bitrate from the total IVAS bitrate; and determining, the combination of the one or more bitrates for the one or more downmix channels based on one or more of the target bitrate, the minimum bitrate, the maximum bitrate, the total downmix bitrate and a priority assigned to the one or more downmix channels.

* * * * *